(12) United States Patent
Uchibori

(10) Patent No.: US 10,737,884 B2
(45) Date of Patent: Aug. 11, 2020

(54) CONVEYANCE APPARATUS

(71) Applicant: NAKANISHI METAL WORKS CO., LTD., Osaka-shi (JP)

(72) Inventor: Toshiyuki Uchibori, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 16/180,455

(22) Filed: Nov. 5, 2018

(65) Prior Publication Data

US 2019/0135547 A1    May 9, 2019

(30) Foreign Application Priority Data

Nov. 9, 2017  (JP) ................. 2017-216427

(51) Int. Cl.
| | |
|---|---|
| B65G 35/08 | (2006.01) |
| B65G 23/24 | (2006.01) |
| B65G 35/06 | (2006.01) |

(52) U.S. Cl.
CPC ............ B65G 23/24 (2013.01); B65G 35/06 (2013.01)

(58) Field of Classification Search
None
See application file for complete search history.

(56) References Cited

U.S. PATENT DOCUMENTS

| | | | | |
|---|---|---|---|---|
| 6,022,443 A | * | 2/2000 | Rajala | .............. A61F 13/15764 |
| | | | | 156/302 |
| 6,905,432 B2 | * | 6/2005 | Oser | ....................... B66D 3/18 |
| | | | | 474/141 |
| 2018/0237034 A1 | * | 8/2018 | Kageyama | ............. B65G 35/06 |

FOREIGN PATENT DOCUMENTS

| | | |
|---|---|---|
| JP | S61-142705 U | 9/1986 |
| JP | 2004-106760 A | 4/2004 |
| JP | 2017-81703 A | 5/2017 |

* cited by examiner

*Primary Examiner* — Kavel Singh
(74) *Attorney, Agent, or Firm* — Kratz, Quintos & Hanson, LLP

(57) ABSTRACT

A transferring speed-change device is provided between an upstream-side stage and a downstream-side stage which are different from each other in conveying speed and conveying pitch. A speed change pinion is meshed with a transferring rack at the same speed as that of an upstream-side pinion; is maintained at the same speed as that of the upstream-side pinion until a main rack is disengaged from the upstream-side pinion; and is used to drive the carrier after the main rack is disengaged from the upstream-side pinion. The speed change pinion is caused to have the same speed as that of a downstream-side pinion immediately before the main rack meshes with the downstream-side pinion; and is maintained at the same speed as that of the downstream-side pinion until the transferring rack is disengaged from the speed change pinion.

9 Claims, 21 Drawing Sheets

FIG. 12
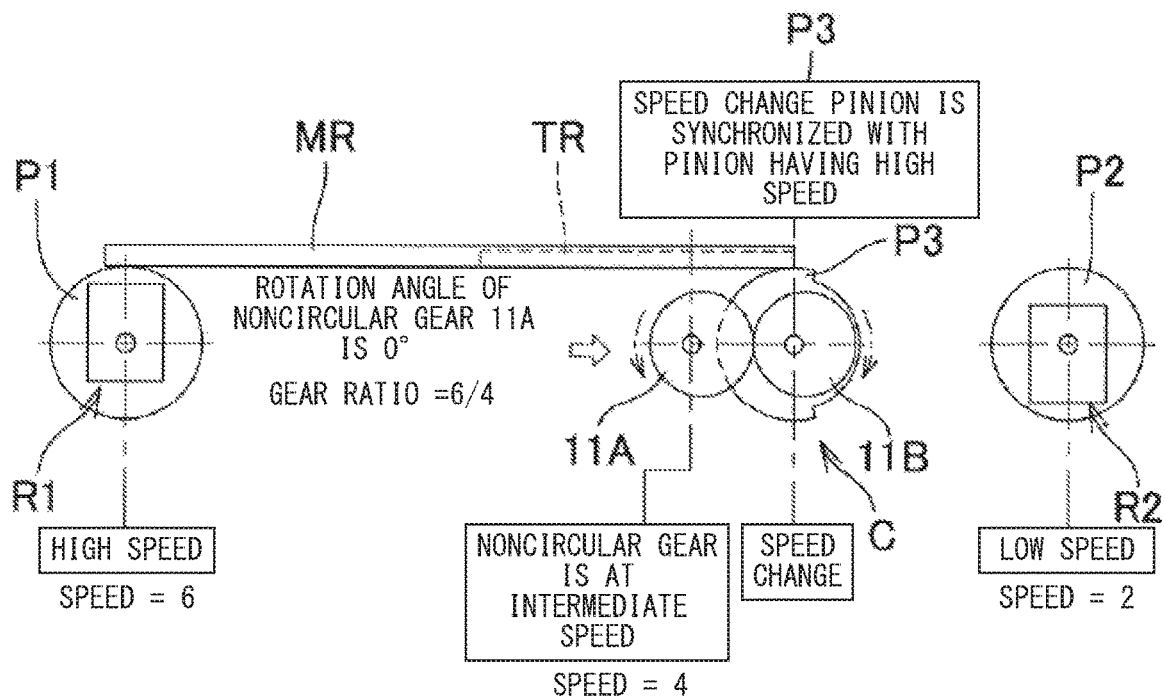
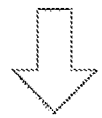
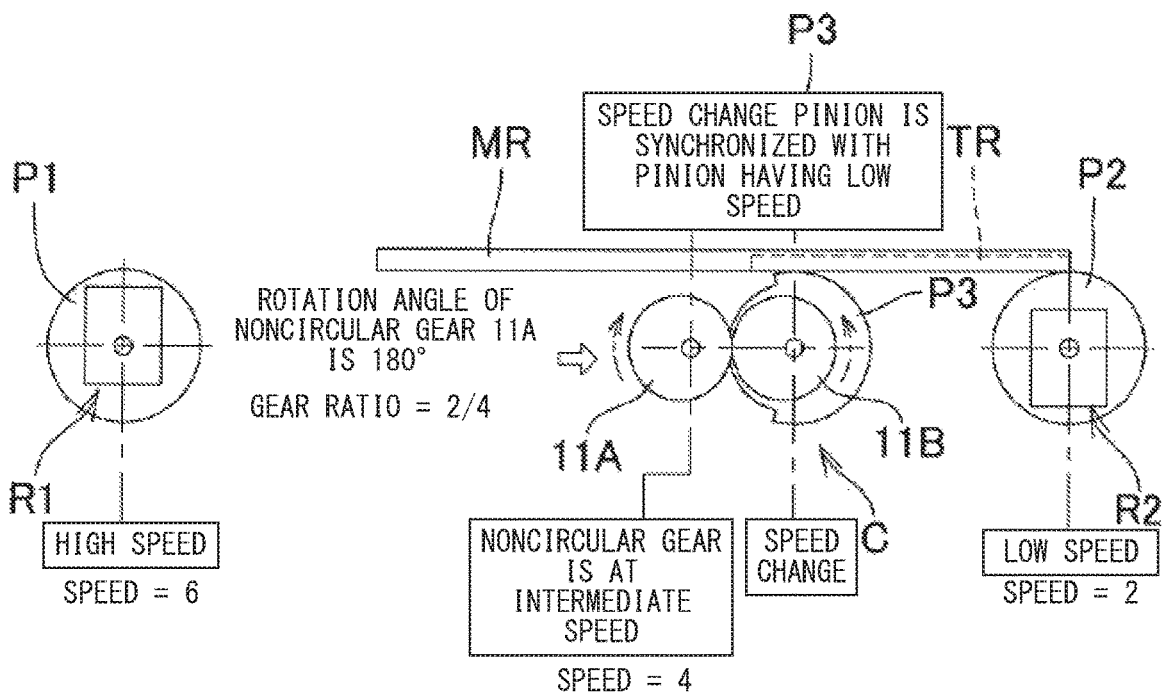

FIG. 13
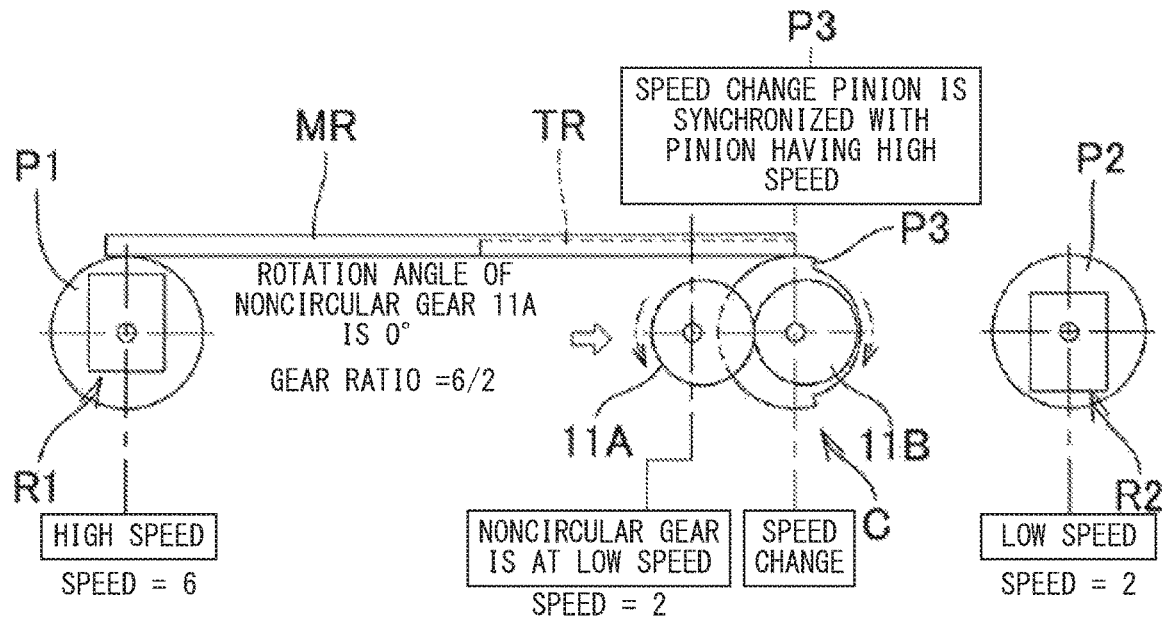
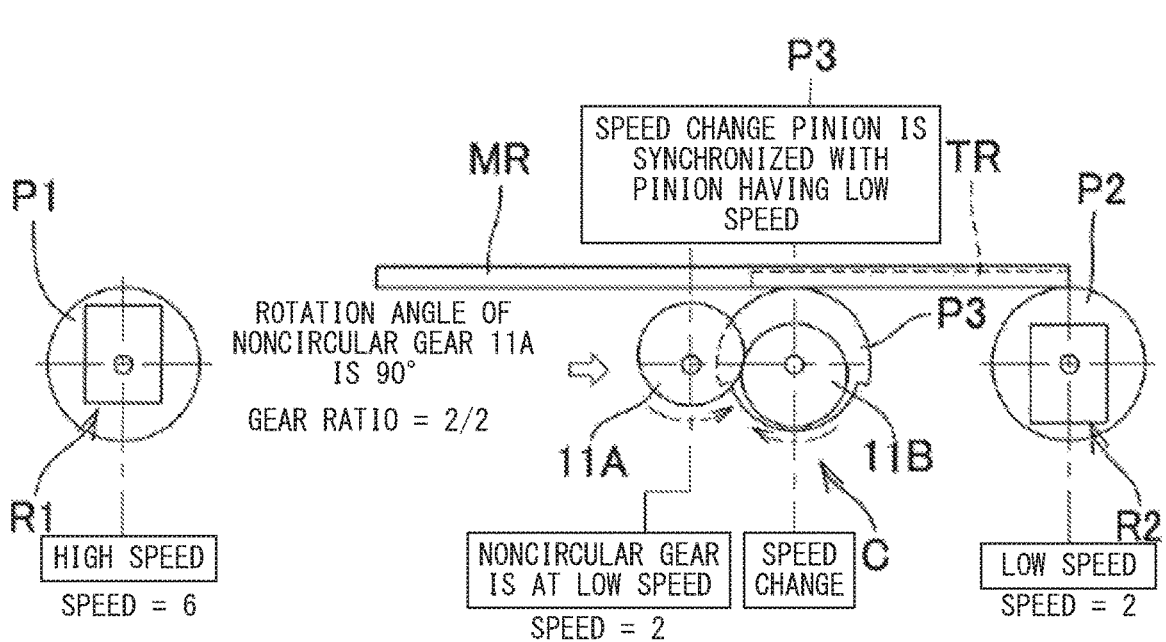

CONVEYANCE APPARATUS

FIELD OF THE INVENTION

The present invention relates to a conveyance apparatus for use in a production line including stages that are different from one another in a conveying speed for carriers that supports objects to be conveyed and in a conveying pitch between the carriers.

DESCRIPTION OF THE BACKGROUND ART

In some production lines in which an object to be conveyed is worked on and processed while a carrier that supports the object to be conveyed is conveyed, a conveying speed and a conveying pitch (inter-carrier pitch) are differentiated in each of the stages in the production line, depending on the circumstances on a working stage and a processing stage.

Conveyance apparatuses for use in such a production line need to be configured to enable smooth transfer between the stages.

Examples of the conveyance apparatus configured so that a conveying speed for each carrier varies among conveyance areas are described below (e.g., see Patent Literatures 1 to 3).

A conveyance apparatus of Patent Literature 1 is used in a roller conveyor on which an object to be conveyed is conveyed without any carrier. The conveyance apparatus includes: a speed increasing conveyance device that gradually increases the conveying speed and is disposed between roller conveyors; and a speed reducing conveyance device that gradually reduces the conveying speed and is disposed between the roller conveyors. The speed increasing conveyance device is provided at a position where a carrier is transferred from a low-speed roller conveyor to a high-speed roller conveyor, whereas the speed reducing conveyance device is provided at a position where the carrier is transferred from the high-speed roller conveyor to the low-speed roller conveyor, (FIG. 2).

A conveyance apparatus of Patent Literature 2 is provided with a speed adjustment device for increasing or reducing, or adjusting the conveying speed (travelling speed) of a carrier (travelling carriage) moving along a track. In the speed adjustment device, a plurality of speed adjustment units are arranged at a predetermined pitch along a conveyance path, each speed adjustment unit is provided with a speed adjustment pinion to be meshed with a rack of the carrier, and interlocking shafts for interlocking and connecting the plurality of speed adjustment units are provided. In addition, a speed-adjustment rotational drive device which rotationally drives the speed adjustment pinions of the respective speed adjustment units via the interlocking shafts is provided, and a mechanical-type speed change mechanism is interposed at a portion, of each speed adjustment unit, that is located between the interlocking shaft and the speed adjustment pinion.

The speeds of the speed adjustment pinions are different from one another, and the carrier needs to transfer between the speed adjustment pinions having different speeds. In view of the situation, a meshing-adjustment mechanism is provided for accepting rotational deviation of the speed adjustment pinion meshed with the rack of the carrier. The mesh-adjustment mechanism supports the speed adjustment pinion so as to be rotatable by at least one or more pitch angles (FIGS. 3 and 4).

A conveyance apparatus of Patent Literature 3 has a configuration in which pinions arranged at predetermined intervals along a conveyance path are engaged with a rack provided to a carrier (conveyance carriage), and the carrier is moved by rotation of the pinions. In this configuration, the rack is composed of: a body portion having a center portion at which a plurality of fixing rack teeth are provided; and movable portions which are provided at front and rear sides of the body portion and include movable rack teeth. Each movable portion is supported so as to be rotatable around a support shaft portion provided frontward, in the movement direction, of a position at which the movable rack teeth of the movable portion are present (FIGS. 4 to 6).

CITATION LIST

Patent Literature

[Patent Literature 1] Japanese Utility Model Publication No. S61-142705
[Patent Literature 2] Japanese Unexamined Patent Application Publication No. 2004-106760
[Patent Literature 3] Japanese Unexamined Patent Application Publication No. 2017-81703

SUMMARY OF THE INVENTION

Technical Problem

In a conveyance apparatus by which a carrier supporting an object to be conveyed is conveyed in a production line in which conveying speed and conveying pitch are set to vary among stages, the conveying pitch may be deviated. If such deviation occurs especially on a stage where an industrial robot performs a work, the relative position is deviated between an industrial robot operated by means of teaching playback by executing a program created through teaching in advance, and an object to be conveyed, such as a workpiece.

Therefore, in order to enable a required work to be reliably performed by an industrial robot, the conveying pitch should be set within a predetermined accuracy.

With respect to such demand, the conveyance apparatus of Patent Literature 1 uses the roller conveyors. However, the rollers and the object to be conveyed do not mesh with each other in these roller conveyors, causing a slip to occur between each roller and the object to be conveyed. This may cause the conveyance position to deviate. In view of the above, the conveyance apparatus of Patent Literature 1 is unsuitable for a use in which the accuracy is required for destination where the object to be conveyed is conveyed.

In each of the conveyance apparatuses of Patent Literatures 2 and 3, a rack-and-pinion mechanism is used. In a normal state where the rack and the pinion are meshed with each other, no slip occurs between the rack and each pinion.

Here, when the carrier is transferred between stages that are different from each other in conveying pitch in addition to conveying speed, constant accuracy in meshing is required between the rack and the pinion.

In the conveyance apparatus of Patent Literature 2, each of the speed adjustment pinons is provided with a meshing-adjustment mechanism that rotatably supports the speed adjustment pinion by at least one or more pitch angles, for allowing the carrier to transfer between the speed adjustment pinions, which have different speeds, of the plurality of speed adjustment units arranged at the predetermined pitch.

Accordingly, accurate meshing between the rack of the carrier and each of the speed adjustment pinions arranged at predetermined positions on the conveyance path cannot be constantly performed.

In the conveyance apparatus of Patent Literature 3, in a case where a conveying speed for the carrier is reduced, the movable portion on the front side is pressed upward by a low-speed pinion on the front side without any engagement between the low-speed pinion on the front side and the movable rack teeth of the movable portion on the front side, thereby smoothly reducing the conveying speed for the carrier.

Accordingly, there is a state where the low-speed pinion on the front side and the movable rack teeth of the movable portion on the front side are not meshed with each other, and thus accurate meshing between the rack of the carrier and each of the pinions arranged at the predetermined positions on the conveyance path cannot be constantly performed.

In view of the above-described backgrounds, an object to be achieved by the present invention is to, in a production line including stages which are different from one another in a conveying speed for carriers supporting objects to be conveyed and in a conveying pitch between the carriers, configure a conveyance apparatus with a rack-and-pinion mechanism composed of a rack of each carrier and pinions arranged at predetermined positions on a conveyance path, and constantly perform accurate meshing between the rack and each pinion.

Solution to Problem

As a result of conducting thorough research in order to achieve the above-described object, the inventor of the present invention has conceived of the present invention.

Specifically, the configuration of the present invention is as follows.

[1] A conveyance apparatus including:
  carriers movable in a conveyance direction along a track and configured to support objects to be conveyed;
  racks having rack teeth, the racks being provided to the carriers and extending in the conveyance direction;
  a plurality of pinions configured to mesh with each rack and arranged along the track;
  a mechanical connection section connecting the plurality of pinions and extending in the conveyance direction; and
  a drive unit configured to drive the mechanical connection section,
  the conveyance apparatus being for use in a production line including stages which are different from one another in a conveying speed for the carriers and a conveying pitch therebetween, wherein
  the mechanical connection section is subjected to speed change via a speed change machine, between an upstream-side stage and a downstream-side stage which are different from each other in the conveying speed for the carriers and the conveying pitch therebetween,
  a transferring speed-change device is provided between the upstream-side stage and the downstream-side stage,
    the transferring speed-change device is connected to the mechanical connection section on the upstream-side stage or the mechanical connection section on the downstream-side stage,
    the transferring speed-change device includes
      a speed change pinion configured to be subjected to speed change during movement of each of the carriers, and
      a mechanical-type speed change mechanism configured to mechanically perform the speed change in the speed change pinion,
    on the upstream-side stage,
      the carrier is moved in a state where the rack is meshed with an upstream-side pinion among the pinions,
    on the downstream-side stage,
      the carrier is moved in a state where the rack is meshed with a downstream-side pinion among the pinions, and,
    between the upstream-side stage and the downstream-side stage,
      the carrier is moved in a state where the speed change pinion subjected to the speed change by the mechanical-type speed change mechanism of the transferring speed-change device, is meshed with the rack provided to the carrier or a rack different from the rack provided to the carrier, with a speed of the speed change pinion being changed from a speed of the upstream-side pinion to a speed of the downstream-side pinion within a period from start of meshing of the speed change pinion with the rack or the different rack to end of the meshing.

[2] The conveyance apparatus according to [1], wherein the mechanical-type speed change mechanism includes a pair of noncircular gears which are an input-side noncircular gear and an output-side noncircular gear.

[3] The conveyance apparatus according to [2] further comprising
  a connection portion configured to perform speed increase or speed reduction, between the input-side noncircular gear, and the mechanical connection section on the upstream-side stage or the mechanical connection section on the downstream-side stage.

[4] The conveyance apparatus according to any of [1] to [3], wherein
  the carrier includes
    a transferring rack having rack teeth and a predetermined length, the transferring rack extending parallelly to the rack and being positioned so as to be apart therefrom in a horizontal direction orthogonal to the conveyance direction, and
  as the carrier moves, the transferring speed-change device
    causes the speed change pinion to mesh with the transferring rack at a same speed as that of the upstream-side pinion meshed with the rack,
    maintains the speed change pinion at the same speed as that of the upstream-side pinion until the rack is disengaged from the upstream-side pinion,
    drives the carrier by means of the speed change pinion meshed with the transferring rack, after the rack is disengaged from the upstream-side pinion,
    causes the speed change pinion to have a same speed as that of the downstream-side pinion before the rack meshes with the downstream-side pinion, and
    maintains the speed change pinion at the same speed as that of the downstream-side pinion until the transferring rack is disengaged from the speed change pinion.

[5] The conveyance apparatus according to any of [1] to [3], wherein
    as the carrier moves, the transferring speed-change device
        causes the speed change pinion to mesh with the rack at a same speed as that of the upstream-side pinion meshed with the rack,
        maintains the speed change pinion at the same speed as that of the upstream-side pinion until the rack is disengaged from the upstream-side pinion,
        drives the carrier by means of the speed change pinion meshed with the rack, after the rack is disengaged from the upstream-side pinion, and
        causes the speed change pinion to have a same speed as that of the downstream-side pinion before the rack meshes with the downstream-side pinion, and
    a mechanism is provided in which, after the rack is transferred to the downstream-side pinion, the transferring speed-change device is shifted so that the speed change pinion is disengaged from the rack, and the transferring speed-change device is returned to an original position thereof in a state where the carrier has moved in the conveyance direction so that the speed change pinion does not mesh with the rack even when the speed change pinion is returned to an original position thereof.
[6] The conveyance apparatus according to [2], further comprising
    a speed increaser between the output-side noncircular gear and the speed change pinion, wherein
    the speed increaser has a speed increasing ratio that is set such that the rack is driven over an entire length thereof, by the speed change pinion meshed with the rack, before each of the pair of noncircular gears completes a single rotation.

Advantageous Effects of the Invention

As described above, the conveyance apparatus according to the present invention mainly exhibits the following effects.
(1) Between the upstream-side stage and the downstream-side stage which are different from each other in the conveying speed for the carriers and the conveying pitch therebetween, each carrier can be smoothly transferred from the upstream-side pinion to the downstream-side pinion, the pinions having different speeds.
(2) The conveyance apparatus is configured with the rack-and-pinion mechanism composed of the racks of the carriers and the pinions arranged at the predetermined positions on the conveyance path. In the conveyance apparatus, accurate meshing between each rack and each pinion is constantly performed, and thus the carriers can be conveyed from the upstream-side stage to the downstream-side stage, which are different from each other in the conveying speed for the carriers and the conveying pitch therebetween. Accordingly, the conveying pitch can be stably and reliably set in a predetermined accuracy.
(3) The relative position between an industrial robot operated through teaching playback and each object to be conveyed, such as a workpiece, is not deviated even on a stage where the industrial robot performs a work, whereby a required work can be reliably performed by the industrial robot.
(4) The position relative to the object to be conveyed, such as a workpiece, is not deviated even when a teaching work by the industrial robot is repeatedly performed (e.g., when a work is performed in which the object to be conveyed is conveyed for a distance corresponding to one cycle, and then returns to the original position thereof is performed), i.e., when a reverse rotation operation is performed.

BRIEF DESCRIPTION OF THE DRAWINGS

FIG. 12 is a schematic view for explaining the reason why the average rotation speed of each of the speed change pinion and the output-side noncircular gear needs to be set to an intermediate speed between the rotation speed of the upstream-side pinion and the rotation speed of the downstream-side pinion, or to a speed approximate to the intermediate speed as much as possible, and shows a case where the rotation speed of the input-side noncircular gear is set to the intermediate speed between the rotation speed of the upstream-side pinion and the rotation speed of the downstream-side pinion;
FIG. 13 is a schematic view similar with FIG. 12, and shows a case where the rotation speed of the input-side noncircular gear is set to be equal to the rotation speed of the downstream-side pinion.

DESCRIPTION OF THE PREFERRED EMBODIMENTS

Figure 1:
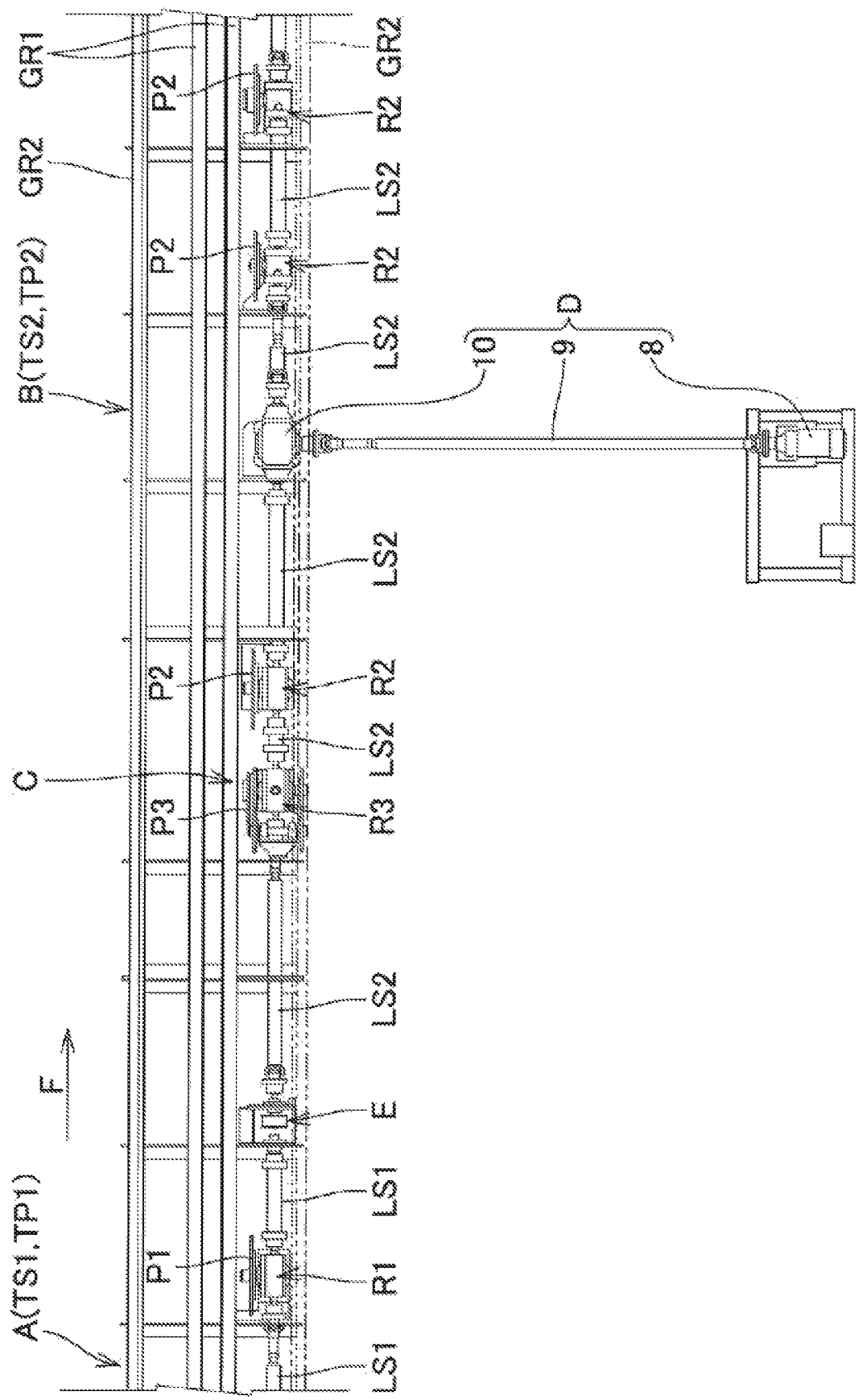
FIG. 1 is a schematic plan view of a conveyance apparatus according to embodiment 1 of the present invention.

Hereinafter, embodiments according to the present invention will be described with reference to the drawings.

In the present specification, the front, rear, left, and right are defined relative to a conveyance direction (in the drawings, see an arrow F) of a carrier 1, and a view seen from the right side is referred to as a front view.

Embodiment 1

Conveyance Apparatus

Figure 2:
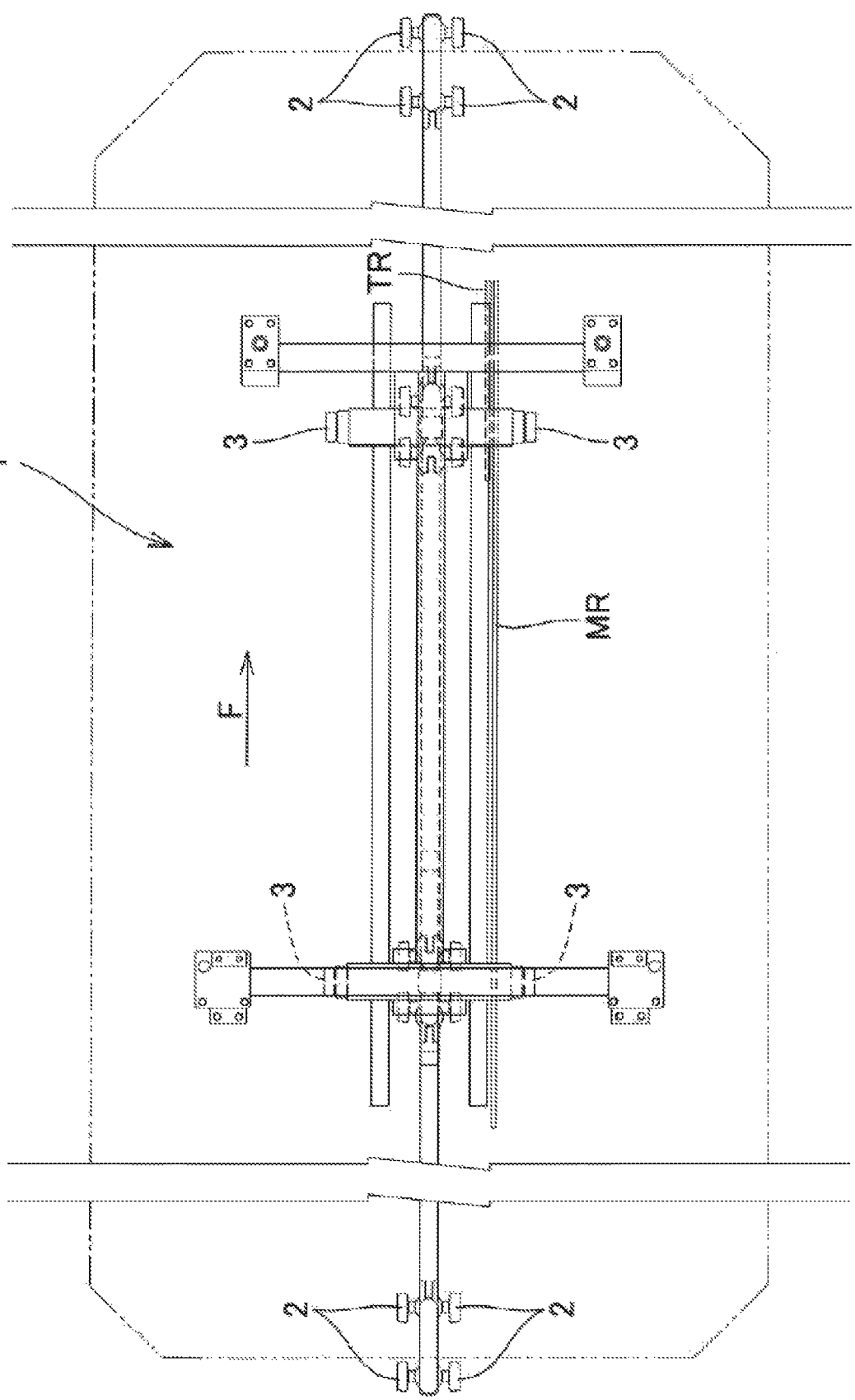
FIG. 2 is a schematic plan view of a carrier.
Figure 3:
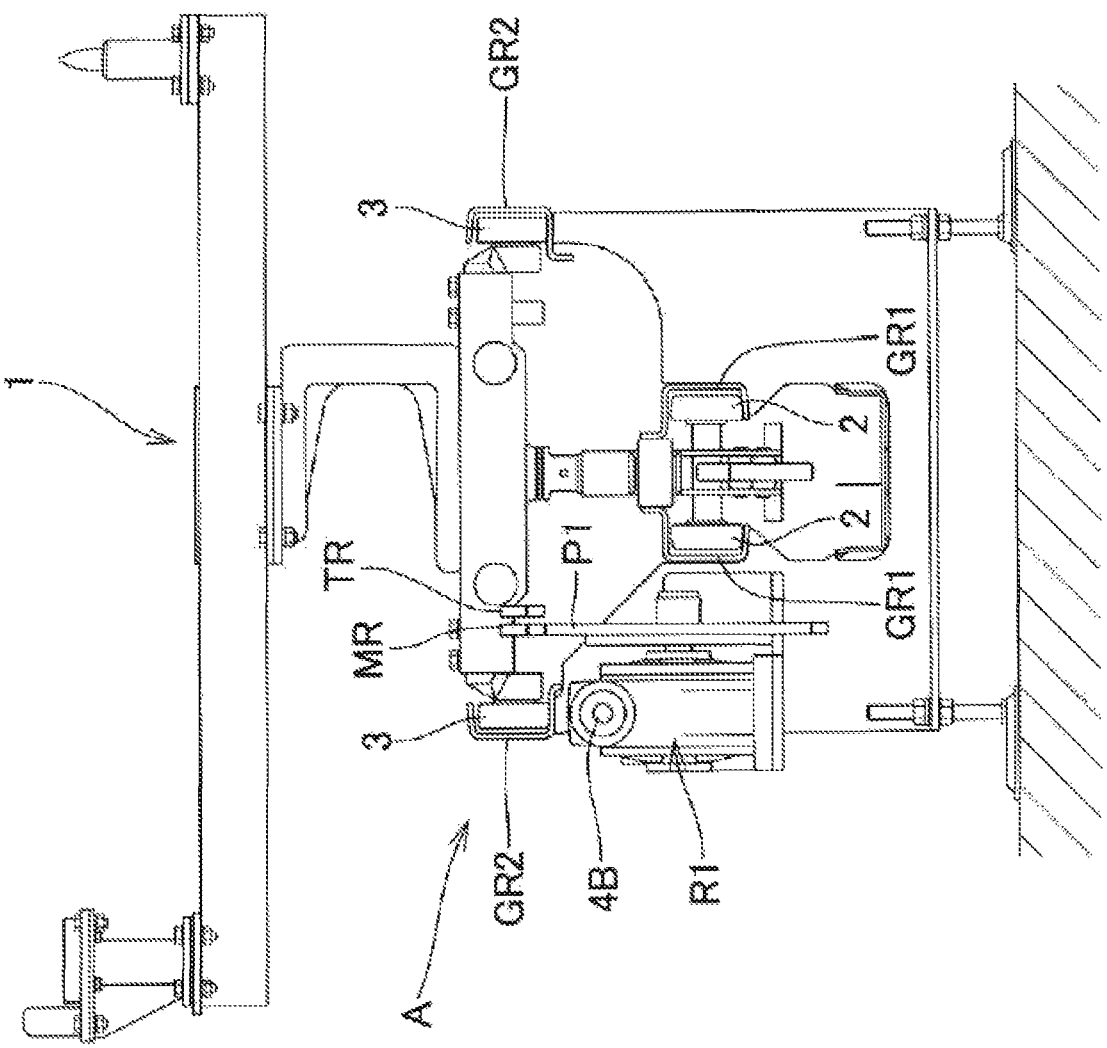
FIG. 3 is a sectional view of the carrier positioned on an upstream-side stage, as seen from the front side.
Figure 4:
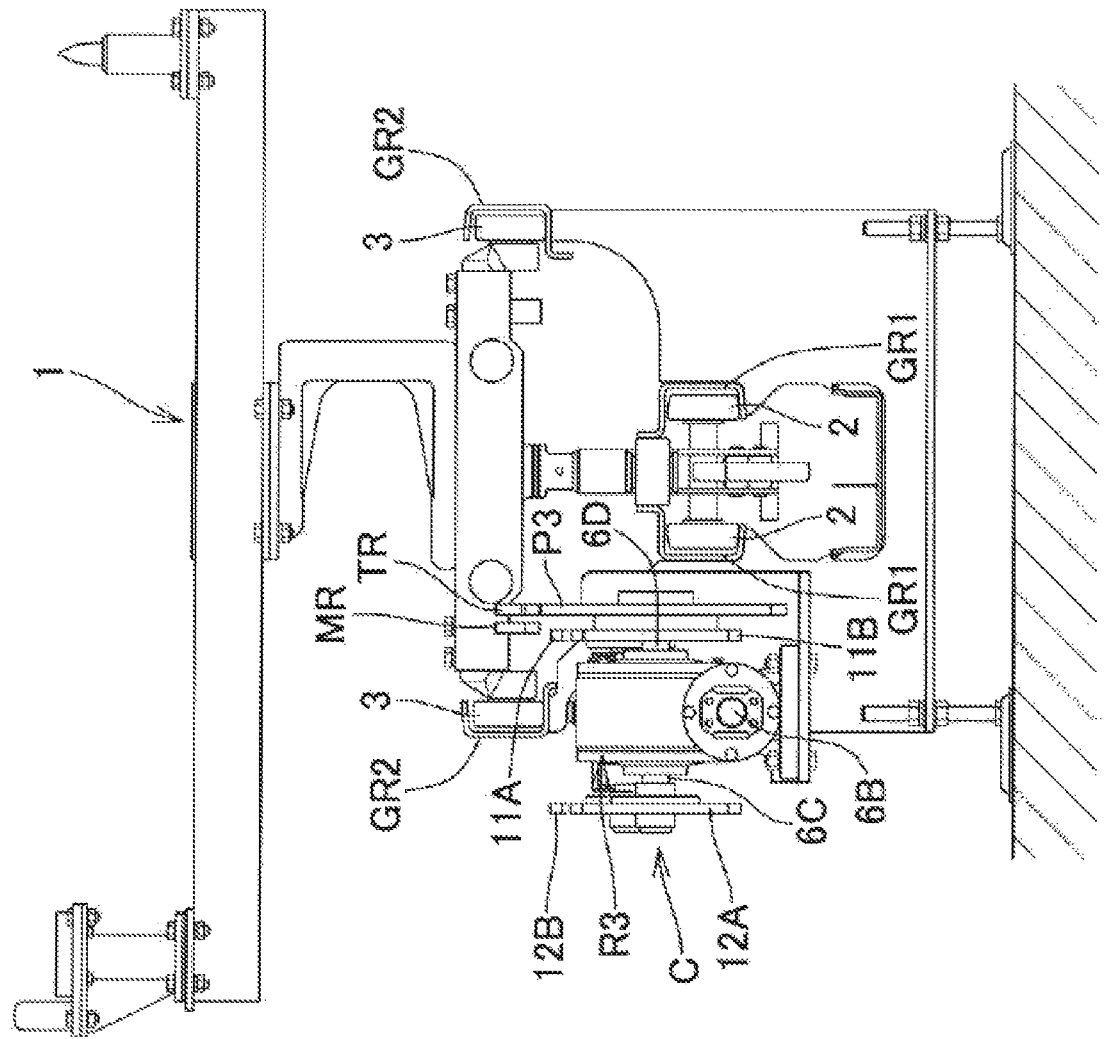
FIG. 4 is a sectional view showing a state where a transferring rack of the carrier is meshed with a speed change pinion of a transferring speed-change device, as seen from the front side.

A conveyance apparatus according to embodiment 1 of the present invention shown in a schematic plan view in FIG. 1 conveys, in the conveyance direction F, the carrier 1 shown in a schematic plan view in FIG. 2, and sectional views as seen from the front side in FIG. 3 and FIG. 4

A conveying speed on an upstream-side stage A is represented by TS1, and a conveying speed on a downstream-side stage B is represented by TS2. The TS1 and the TS2 are different from each other.

A conveying pitch on the upstream-side stage A is represented by TP1, and a conveying pitch on the downstream-side stage B is represented by TP2. The TP1 and the TP2 are different from each other.

On the upstream-side stage A, both-input-shaft-type orthogonal-axis speed reducers R1 each having an output shaft to which an upstream-side pinion P1 is fixed are arranged, and line shafts LS1 and LS1 are connected to input shafts of each orthogonal-axis speed reducer R1.

On the downstream-side stage B, both-input-shaft-type orthogonal-axis speed reducers R2 each having an output shaft to which a downstream-side pinion P2 is fixed are arranged, and line shafts LS2 and LS2 are connected to input shafts of each orthogonal-axis speed reducer R2.

A drive unit D drives the line shafts LS2, and is composed of, for example, a geared motor 8, a drive connection shaft 9, and a transmission gear 10.

Drive force of the geared motor 8 is transmitted to the line shafts LS2 via the drive connection shaft 9 by the transmission gear 10, such as a miter gear.

The drive units D may be provided at a plurality of locations, and the line shafts to be driven by the drive unit D may be line shafts other than the line shafts LS2.

Between the upstream-side stage A and the downstream-side stage B, a transferring speed-change device C is provided at a position close to the downstream-side stage B.

A speed change pinion P3 is connected to an output shaft of a both-input-shaft-type transferring orthogonal-axis speed reducer R3 which composes the transferring speed-change device C and serves as a transferring speed reducer, and the line shafts LS2 are connected to an input shaft on the rear side (upstream side) of the transferring orthogonal-axis speed reducer R3 and an input shaft on the front side (downstream side) of the transferring orthogonal-axis speed reducer R3.

The line shafts extending in the conveyance direction as described above are a mechanical connection section for mechanically connecting the plurality of pinions, and the mechanical connection section may include a timing belt or such sections, other than the line shafts.

Figure 14:
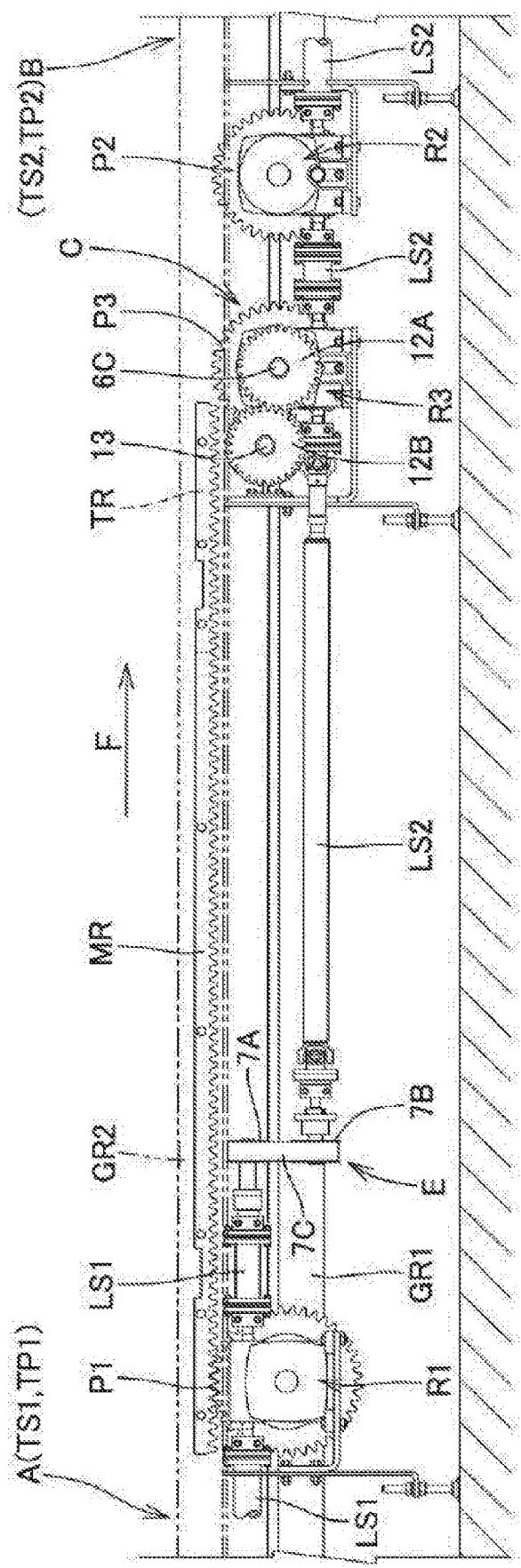
FIG. 14 is a schematic front view for explaining an operation of the conveyance apparatus according to embodiment 1 of the present invention, and shows a state where a main rack of the carrier is meshed only with the upstream-side pinion.

As shown in the schematic plan view in FIG. 1 and a schematic front view in FIG. 14, speed change of the line shafts between the upstream-side stage A and the downstream-side stage B is performed by a speed change machine E.

The speed change machine E includes, for example, timing pulleys 7A and 7B, and a timing belt 7C stretched over the timing pulleys 7A and 7B, and speed increase or speed reduction can be performed by changing the diameters of the timing pulleys 7A and 7B.

The speed change machine E may be implemented by a gear train.

In addition, the position at which the speed change machine E is provided is not limited to the position between the upstream-side pinion P1 and the speed change pinion P3 as in FIG. 1 and FIG. 14, but may be a position between the speed change pinion P3 and the downstream-side pinion P2.

Carrier

As shown in the schematic plan view in FIG. 2 and the sectional view as seen from the front side in FIG. 3, left and right trolley rollers 2 of the carrier 1 engage with guide rails GR1 and GR1, and left and right carrier travelling wheels 3 of the carrier 1 engage with guide rails GR2 and GR2.

Therefore, the carrier 1 supporting an object that is to be conveyed and is not shown can be moved in the conveyance direction F shown in FIG. 1 and FIG. 2 along the guide rails GR1 and GR2 which form a track.

For stabilization of the carrier 1 and reliable engagement of a rack-and-pinion mechanism described later, load of the carrier 1 needs to be received by the carrier travelling wheels 3.

The carrier 1 includes: a main rack MR extending in the conveyance direction F and having rack teeth; and a transferring rack TR which has rack teeth equal to the rack teeth of the main rack MR in terms of module, extends parallelly to the main rack MR, and is positioned so as to be apart therefrom in the left direction that is a horizontal direction orthogonal to the conveyance direction F.

The transferring rack TR has a front end (downstream-side end) of which the position in the front/rear direction is the same as the position in the front/rear direction of the front end (downstream-side end) of the main rack MR. The transferring rack TR extends rearward (toward the upstream side) from the front end thereof so as to have a predetermined length.

The upstream-side pinion P1 or the downstream-side pinion P2 shown in the schematic plan view in FIG. 1 and the sectional view seen from the front side in FIG. 3, is meshed with the main rack MR of the carrier 1, and the speed change pinion P3 shown in the schematic plan view in FIG. 1 and the sectional view as seen from the front side in FIG. 4, is meshed with the transferring rack TR of the carrier 1.

The circular pitches of all of the pinions P1 and pinions P2 which mesh with the main rack MR of the carrier 1 are equal to one another, and the conveying pitches TP1 and TP2 are each set to a pitch obtained by multiplying the circular pitch by an integer.

Accordingly, at the time of the stop of a cycle, the tooth phase (tooth rotational position) becomes equal among all of the pinions P1 and pinions P2 which mesh with the main rack MR.

Therefore, whether or not the tooth phase is equal among the pinions P1 and pinions P2, can be easily checked through a work in which a tooth phase inspection gauge is applied between the pinions.

Figure 5:
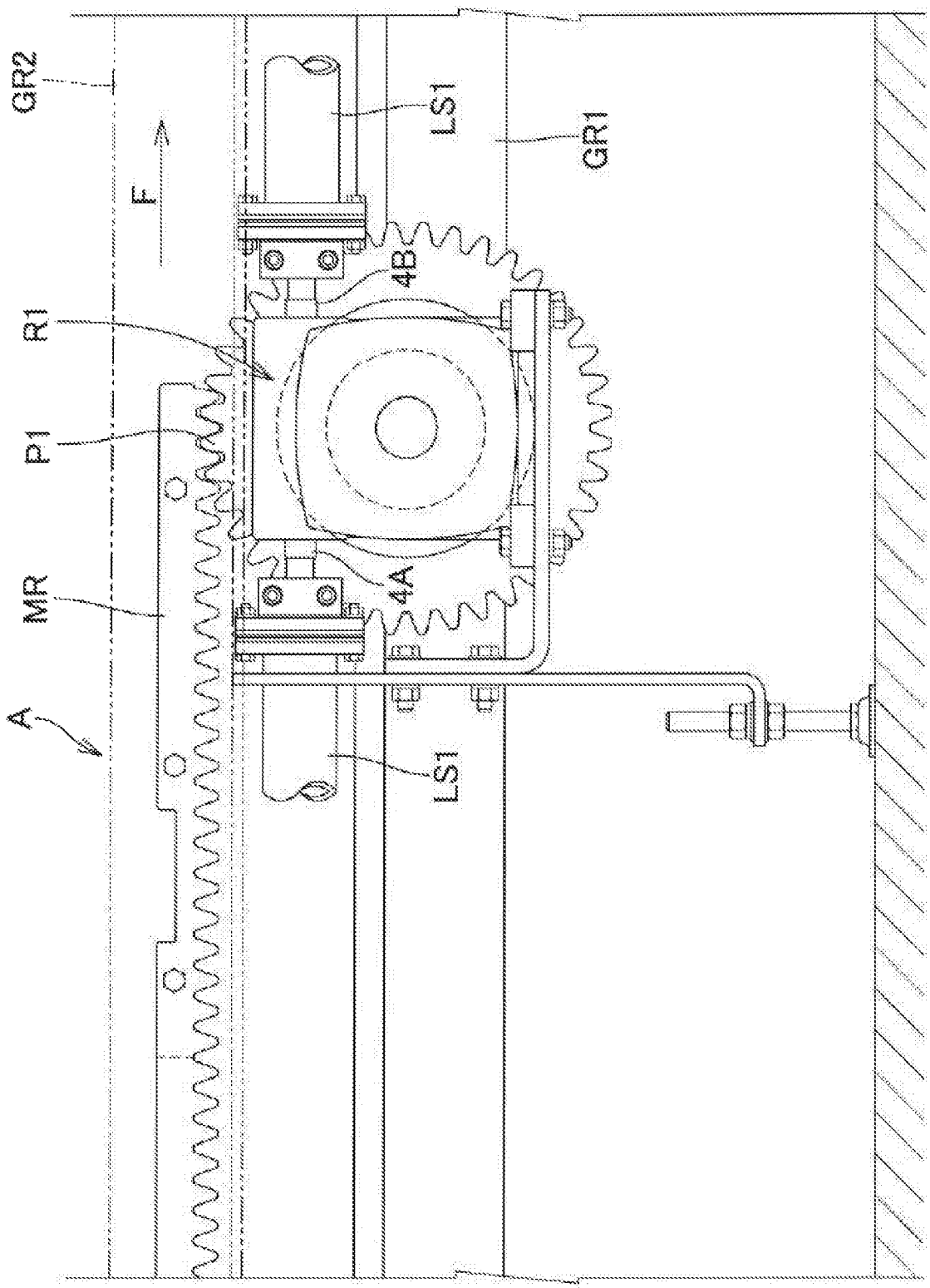
FIG. 5 is an enlarged front view of a main part including line shafts, an orthogonal-axis speed reducer, and a pinion on the upstream-side stage.
Figure 6:
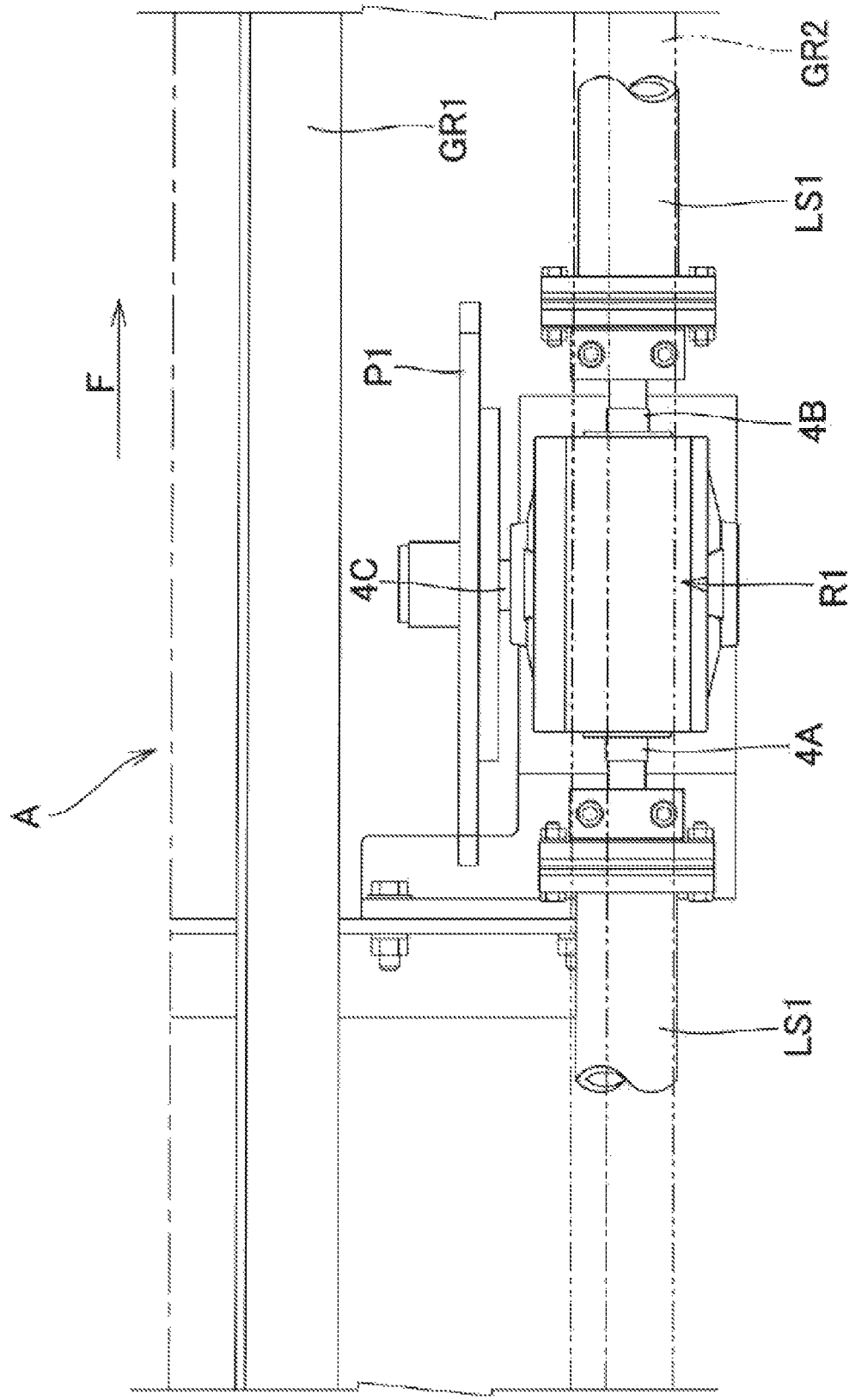
FIG. 6 is an enlarged plan view of the main part shown in FIG. 5.

Details of Orthogonal-Axis Speed Reducer and Area Therearound on Upstream-Side Stage As shown in an enlarged front view of a main part in FIG. 5 and an enlarged plan view of the main part in FIG. 6, each orthogonal-axis speed reducer R1 on the upstream-side stage A is of a both-input type, and is a worm speed reducer, for example.

The line shafts LS1 and LS1 are connected to an input shaft 4A on the rear side (upstream side), which rotates about a front/rear-direction axis, and to an input shaft 4B on the front side (downstream side), which rotates about the front/rear-direction axis. The upstream-side pinion P1 is fixed to an output shaft 4C which projects leftward and rotates about a left/right-direction axis.

Figure 7:
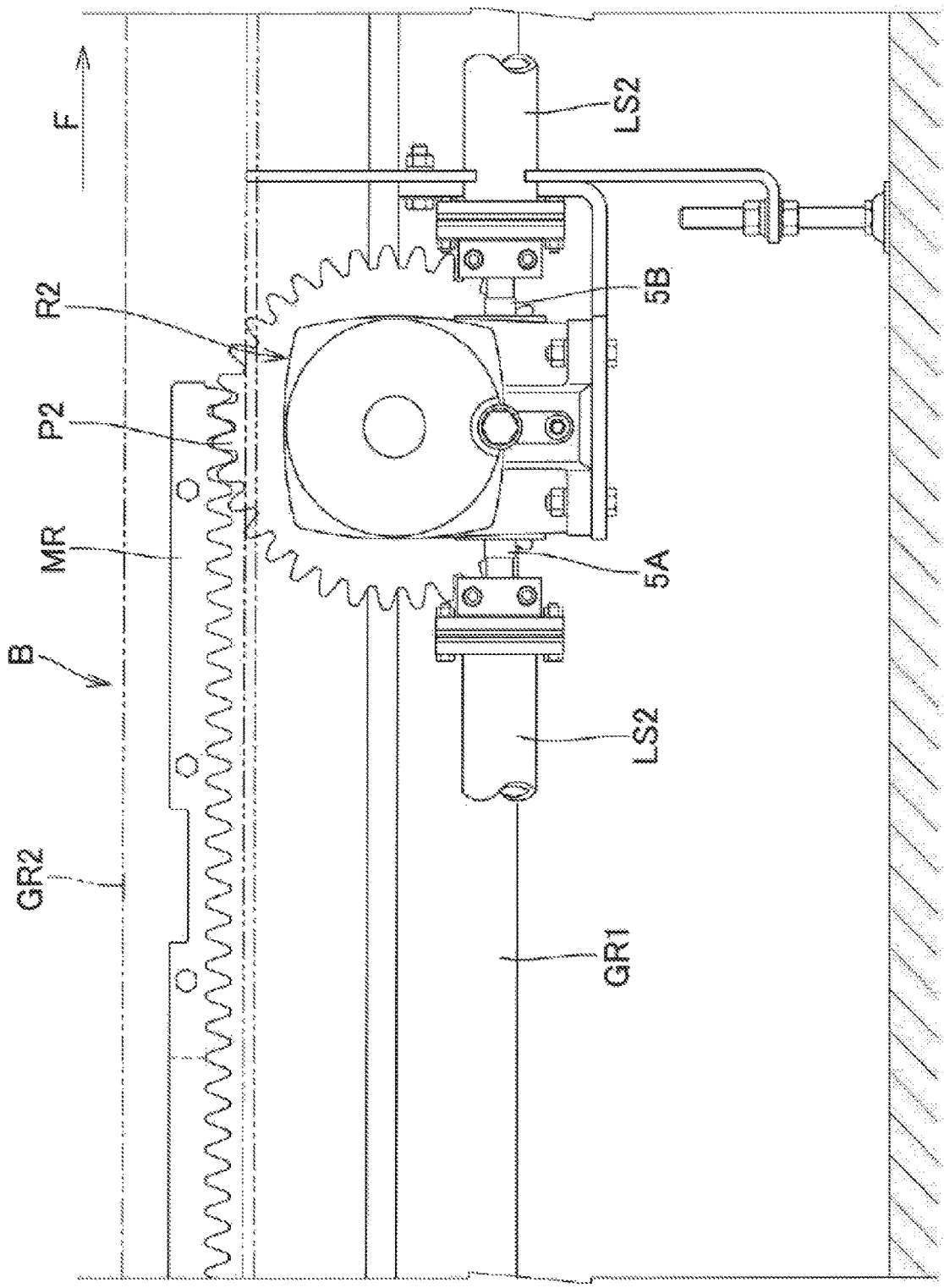
FIG. 7 is an enlarged front view of a main part including line shafts, an orthogonal-axis speed reducer, and a pinion on a downstream-side stage.
Figure 8:
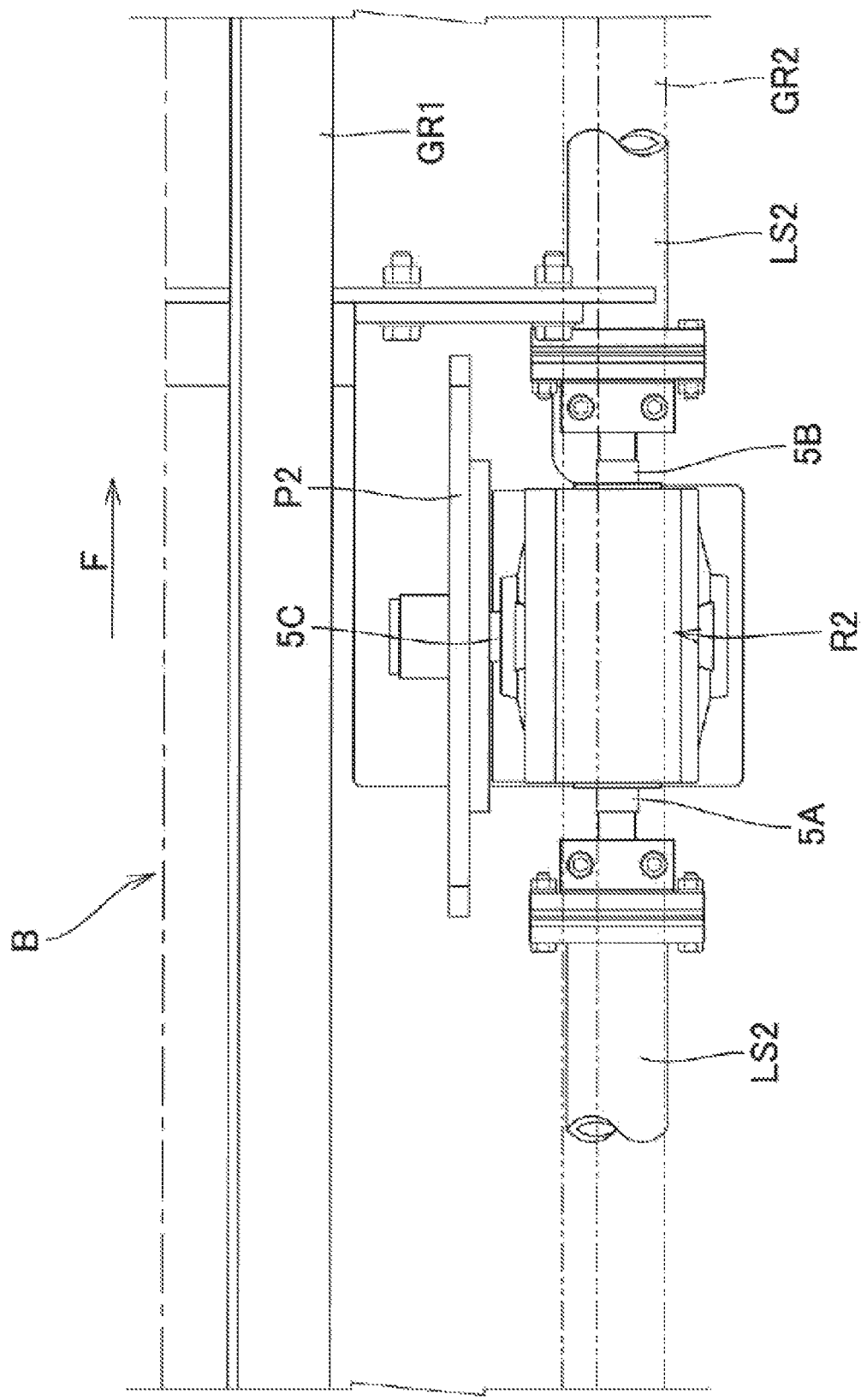
FIG. 8 is an enlarged plan view of the main part shown in FIG. 7.

Details of Orthogonal-Axis Speed Reducer and Area Therearound on Downstream-Side Stage As shown in an enlarged front view of a main part in FIG. 7 and an enlarged plan view of the main part in FIG. 8, each orthogonal-axis speed reducer R2 on the downstream-side stage B is of a both-input type, and is a worm speed reducer, for example.

The line shafts LS2 and LS2 are connected to an input shaft 5A on the rear side (upstream side), which rotates about the front/rear-direction axis, and to an input shaft 5B on the front side (downstream side), which rotates about the front/rear-direction axis. The downstream-side pinion P2 is fixed to an output shaft 5C which projects leftward and which rotates about the left/right-direction axis.

Details of Transferring Orthogonal-Axis Speed Reducer and Area Therearound

Figure 9:
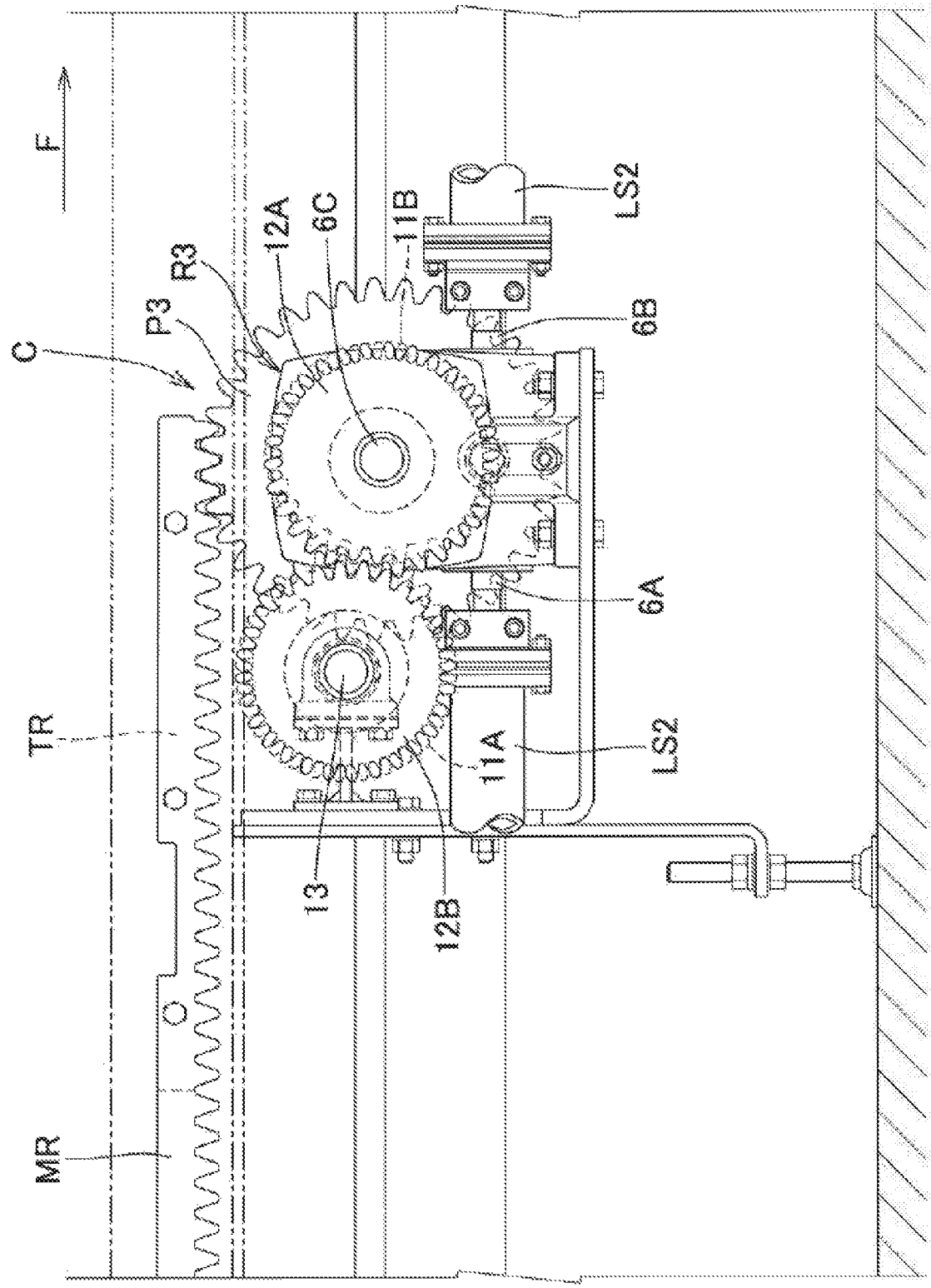
FIG. 9 is an enlarged front view of a main part including the transferring speed-change device and an area therearound.
Figure 10:
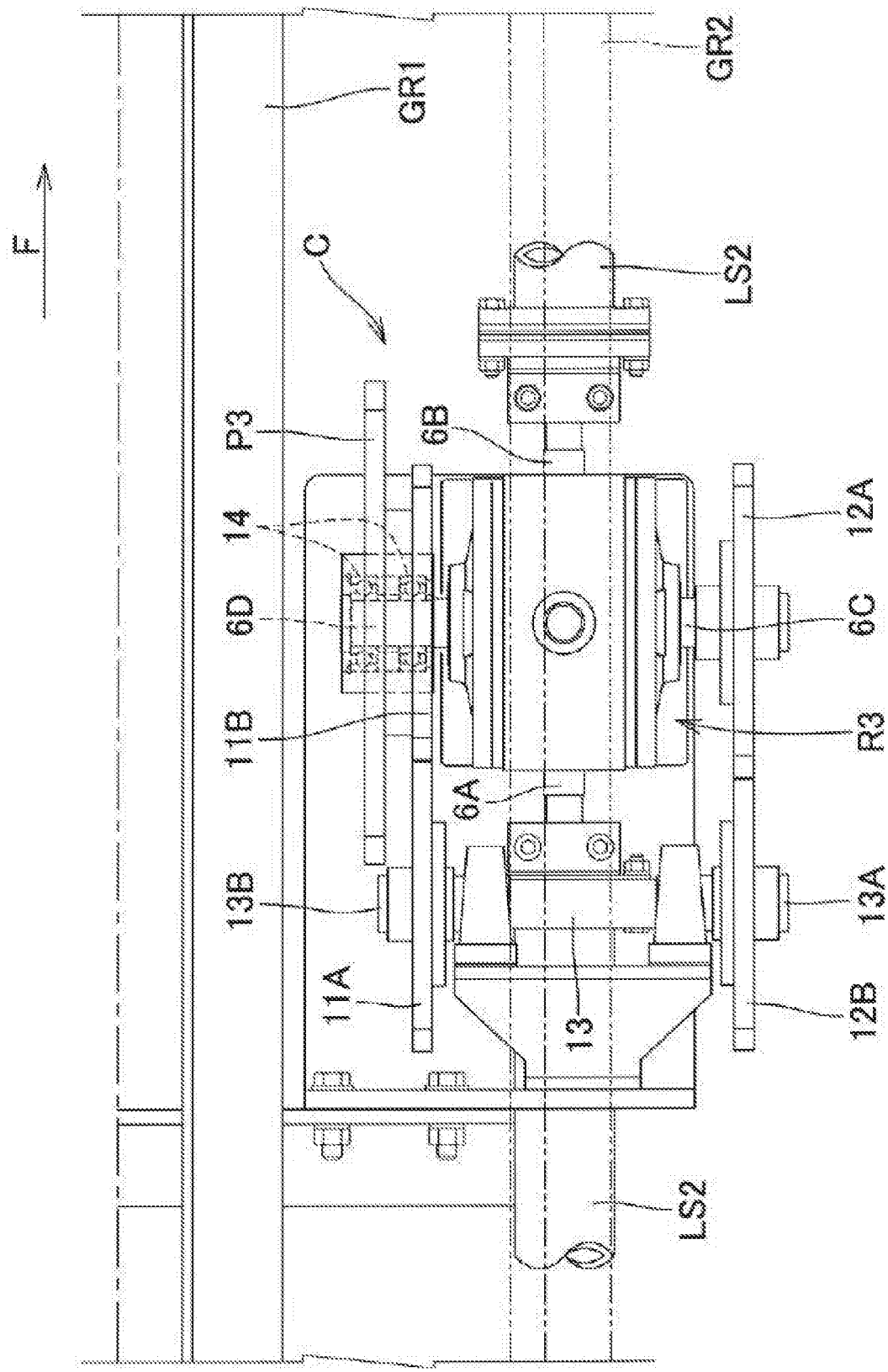
FIG. 10 is an enlarged plan view of the main part shown in FIG. 9.

As shown in an enlarged front view of a main part in FIG. 9 and an enlarged plan view of the main part in FIG. 10, the transferring orthogonal-axis speed reducer R3 which composes the transferring speed-change device C is of a both-input-shaft type and a both-output-shaft type, and is a worm speed reducer, for example.

The line shaft LS2 is connected to an input shaft 6A on the rear side (upstream side), which rotates about the front/rear-direction axis. The line shaft LS2 is connected to an input shaft 6B on the front side (downstream side), which rotates about the front/rear-direction axis.

A first spur gear 12A is fixed to an output shaft 6C which projects rightward and which rotates about the left/right-direction axis. A second spur gear 12B meshed with the first spur gear 12A is fixed to a side close to one end 13A, in the left/right direction, of a support shaft 13 which is parallel to the output shaft 6C. An input-side noncircular gear 11A is fixed to a side close to the other end 13B of the support shaft 13.

An output-side noncircular gear 11B is meshed with the input-side noncircular gear 11A, and the speed change pinion P3 is fixed to the output-side noncircular gear 11B coaxially with the output-side noncircular gear 11B.

An output shaft 6D, of the transferring orthogonal-axis speed reducer R3, which projects leftward and rotates about the left/right-direction axis, supports the output-side noncircular gear 11B and the speed change pinion P3 via bearings 14.

Details of Noncircular Gears

Figure 11:
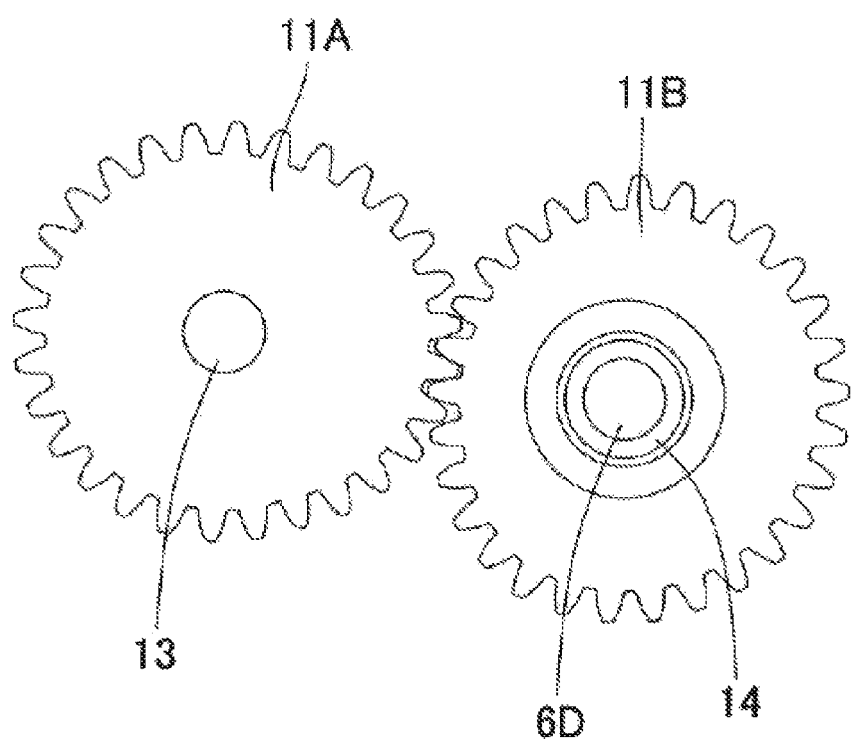
FIG. 11 is a schematic front view of a pair of noncircular gears.

FIG. 11 shows a schematic front view of a pair of the noncircular gears 11A and 11B which are a mechanical-type speed change mechanism for mechanically changing speed of the speed change pinion P3.

The number of teeth is equal between the input-side noncircular gear 11A and the output-side noncircular gear 11B. The gear shafts 13 and 6D are parallel to each other. The distance between the shafts is fixed.

The input-side noncircular gear 11A is linked to the output shaft 6C of the transferring orthogonal-axis speed reducer R3, which rotates at a constant speed, and thus is rotated at the constant speed, whereas the output-side noncircular gear 11B is rotated at an irregular speed.

The number of rotations of each of the input-side noncircular gear 11A and the output-side noncircular gear 11B in a time period needed for the carrier 1 to move for a predetermined conveying pitch, is set to an integer number. In order to achieve this setting, speed increase or speed reduction is performed as necessary by means of a gear connection portion of the first spur gear 12A and the second spur gear 12B.

The purpose of setting, to an integer number, the number of rotations of each of the input-side noncircular gear 11A and the output-side noncircular gear 11B to be performed in a time period needed for the carrier 1 to move for the predetermined conveying pitch, is to cause the transferring rack TR to mesh with a specific tooth of the speed change pinion P3, specifically, to cause the transferring rack TR to mesh with a specific tooth of the speed change pinion P3, at which the speed of the speed change pinion P3 becomes equal to that of the upstream-side pinion P1.

The output-side noncircular gear 11B of the pair of the noncircular gears 11A and 11B is integrated with the speed change pinion P3. Accordingly, the speed ratio of the noncircular gears 11A and 11B is set so that speed of the speed change pinion P3 is changed in a manner described below along with the movement of the carrier 1.

(1) The speed change pinion P3 is meshed with the transferring rack TR at the same speed as that of the upstream-side pinion P1 meshed with the main rack MR. It is noted that the speed of the speed change pinion P3 is kept at the same speed as that of the upstream-side pinion P1 since before the speed change pinion P3 meshes with the transferring rack TR.

(2) The speed change pinion P3 is maintained at the same speed as that of the upstream-side pinion P1 until the main rack MR is disengaged from the upstream-side pinion P1.
(3) The speed change pinion P3 is set to have the same speed as that of the downstream-side pinion P2 before the main rack MR meshes with the downstream-side pinion P2.
(4) The speed change pinion P3 is maintained at the same speed as that of the downstream-side pinion P2 until the transferring rack TR is disengaged from the speed change pinion P3. It is noted that the speed of the speed change pinion P3 is kept at the same speed as that of the downstream-side pinion P2 immediately after the speed change pinion P3 and the transferring rack TR are released from a meshed state.

When the speed ratio of the noncircular gears 11A and 11B is set, the average rotation speed of each of the speed change pinion P3 and the output-side noncircular gear 11B needs to be set to an intermediate speed between the rotation speed of the upstream-side pinion P1 and the rotation speed of the downstream-side pinion P2, or to a speed approximate to the intermediate speed as much as possible. Such speed adjustment can be easily performed with use of the gear connection portion of the first spur gear 12A and the second spur gear 12B.

The reason why the average rotation speed of each of the speed change pinion P3 and the output-side noncircular gear 11B needs to be set to the intermediate speed between the rotation speed of the upstream-side pinion P1 and the rotation speed of the downstream-side pinion P2, or to a speed approximate to the intermediate speed as much as possible, will be described with reference to schematic views in FIG. 12 and FIG. 13.

As shown in the schematic view in FIG. 12, the rotation speed of the upstream-side pinion P1 is set to a high speed (=6), the rotation speed of the downstream-side pinion P2 is set to a low speed (=2), and the rotation speed of the input-side noncircular gear 11A is set to an intermediate speed (=4).

Regarding the pair of the noncircular gears 11A and 11B, owing to the structures thereof, the lowest speed reduction ratio (speed increase) is obtained when the rotation angle of the input-side noncircular gear 11A is approximately 0°, the highest speed reduction ratio (speed reduction) is obtained when this rotation angle is approximately 180°, and the speed reduction ratio (no speed reduction) is 1 when this rotation angle is approximately 90° or 270°.

Among the angles, an angle used in a speed change section falls within a range of approximately 0° to 180°.

The input-side noncircular gear 11A is at the intermediate speed (=4). Accordingly, transfer is performed in a state where the speed change pinion P3 having the same speed as that of the output-side noncircular gear 11B is synchronized with the upstream-side pinion P1 having the rotation speed (=6) when speed increase is performed with the rotation angle of the input-side noncircular gear 11A being approximately 0°. Then, when the rotation angle of the input-side noncircular gear 11A is approximately 90°, the output-side noncircular gear 11B and the speed change pinion P3 come to have the intermediate speed (=4), and, when the rotation angle of the input-side noncircular gear 11A is approximately 180°, the output-side noncircular gear 11B and the speed change pinion P3 come to have the low speed (=2), so that synchronization with the downstream-side pinion P2 having the rotation speed (=2) is obtained. That is, the speed change is performed with approximately ½ rotation of the speed change pinion P3.

In a case where speed adjustment (in the case of this example, speed increase) is not performed by means of the gear connection portion of the first spur gear 12A and the second spur gear 12B, the input-side noncircular gear 11A comes to have the low speed (=2) as shown in the schematic view in FIG. 13. Accordingly, synchronization with the downstream-side pinion P2 is obtained when the rotation angle of the input-side noncircular gear 11A is approximately 90°, and thus the speed change is performed with approximately ¼ rotation of the speed change pinion P3.

Considering the number of teeth of each of the noncircular gears 11A and 11B the number of teeth of the speed change pinion P3 usable for the speed change is small when speed is changed with approximately ¼ rotation of the speed change pinion P3, as compared to a case where the speed is changed with approximately ½ rotation of the speed change pinion P3 as in FIG. 12. Thus, the speed change (speed reduction or speed increase) cannot be smoothly performed.

Operation of Conveyance Apparatus

Schematic front views for explaining an operation in FIG. 14 to FIG. 17 are referred to.

The carriers 1 driven by the upstream-side pinions P1 move in the conveyance direction F on the upstream-side stage A at the predetermined conveying speed TS1 and the predetermined conveying pitch TP1 in a state where the main rack MR of each carrier 1 is meshed only with the upstream-side pinion P1 as in FIG. 14.

When the carrier 1 further moves in the conveyance direction F and the speed change pinion P3 of the transferring speed-change device C disposed between the upstream-side stage A and the downstream-side stage B is meshed with the transferring rack TR, the speed change pinion P3 is kept at the same speed as that of the upstream-side pinion P1 since before the speed change pinion P3 meshes with the transferring rack TR.

Figure 15:
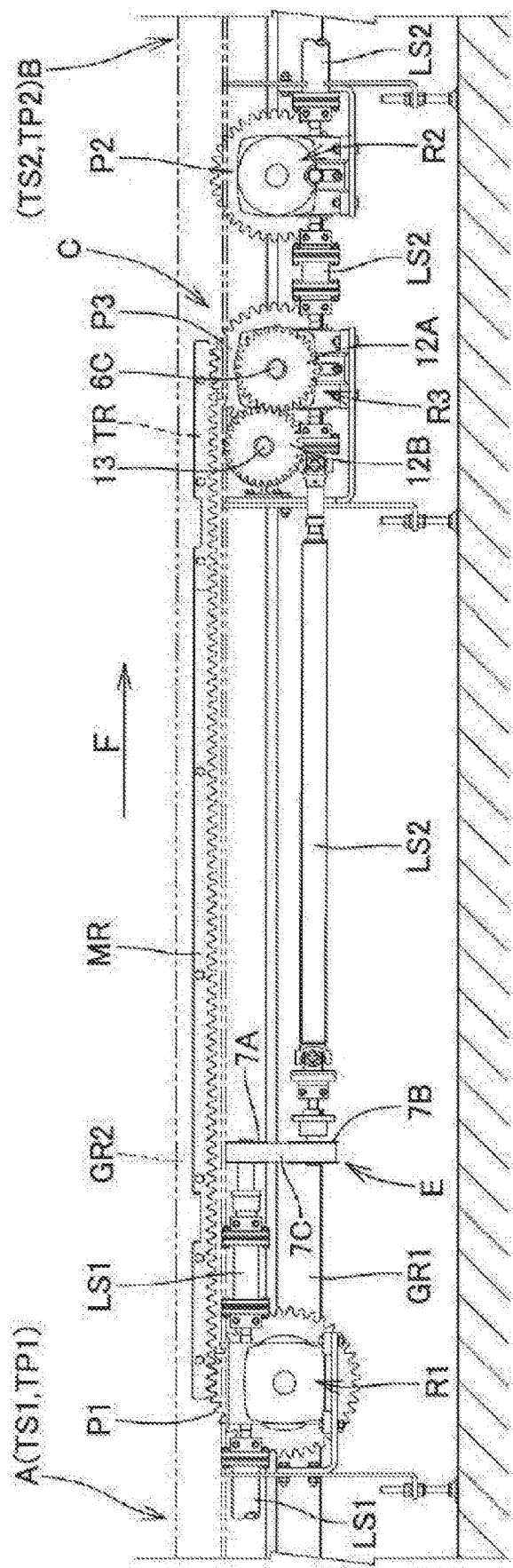
FIG. 15 is a schematic front view similar with FIG. 14, for explaining the operation, and shows a state where the main rack of the carrier is meshed with the upstream-side pinion and the transferring rack is meshed with the speed change pinion.

In a state where the carrier 1 has further moved in the conveyance direction F, the main rack MR of the carrier 1 is meshed with the upstream-side pinion P1, and the transferring rack TR of the carrier 1 is meshed with the speed change pinion P3, as in FIG. 15. The speed change pinion P3 is maintained at the same speed as that of the upstream-side pinion P1 until the main rack MR is disengaged from the upstream-side pinion P1.

Figure 16:
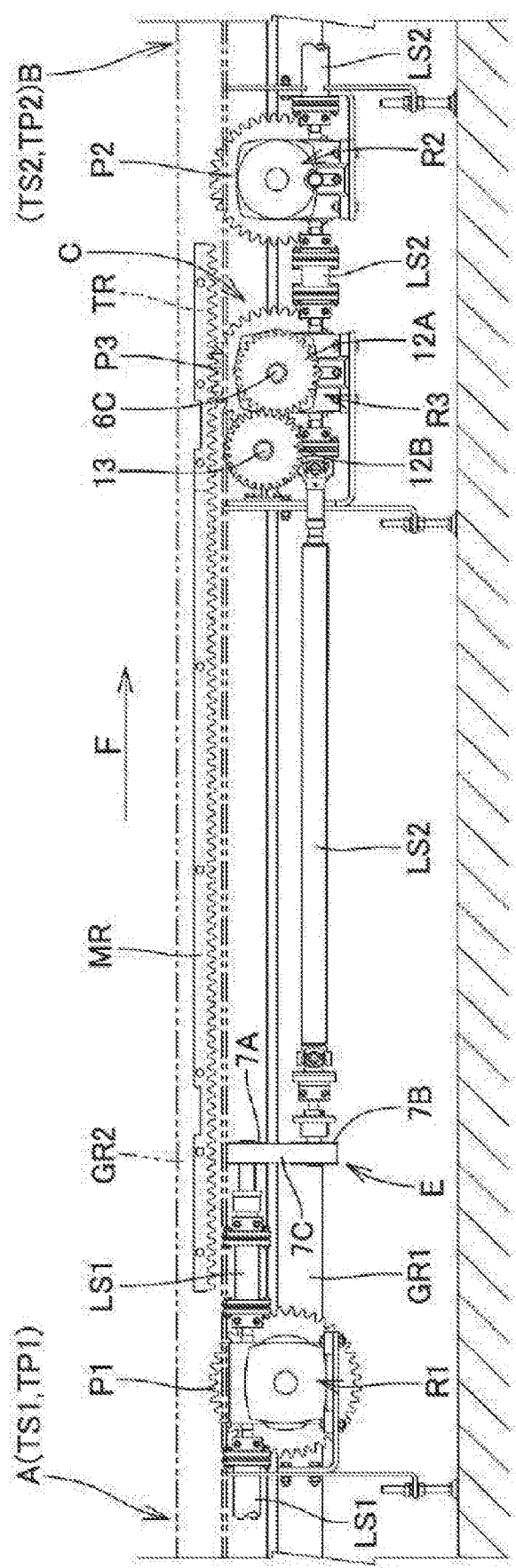
FIG. 16 is a schematic front view similar with FIGS. 14 and 15, for explaining the operation, and shows a state where the transferring rack is meshed only with the speed change pinion.

After the carrier 1 has further moved in the conveyance direction F and the main rack MR is disengaged from the upstream-side pinion P1, the carrier 1 is driven by the speed change pinion P3 meshed with the transferring rack TR as in FIG. 16.

Before the carrier 1 further moves in the conveyance direction F and the main rack MR meshes with the downstream-side pinion P2, the speed change pinion P3 comes to have the same speed as that of the downstream-side pinion P2.

Figure 17:
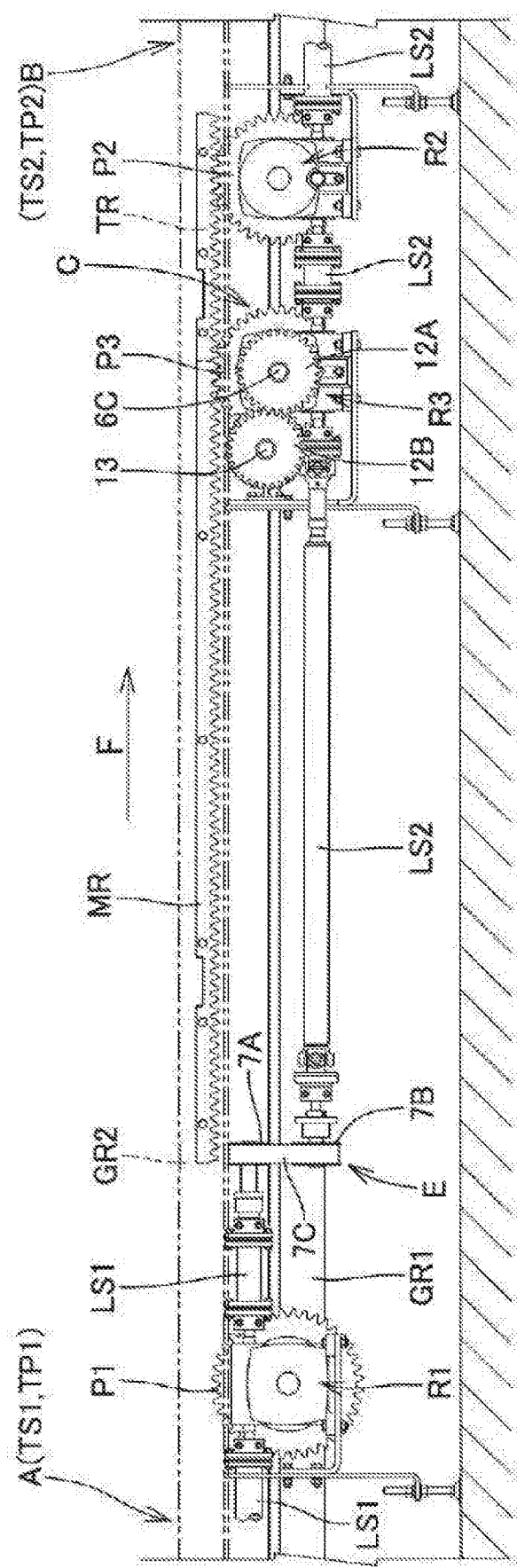
FIG. 17 is a schematic front view similar with FIGS. 14-16, for explaining the operation, and shows a state where the main rack of the carrier is meshed with the downstream-side pinion and the transferring rack is meshed with the speed change pinion.

In a state where the carrier 1 has further moved in the conveyance direction F, the main rack MR of the carrier 1 is meshed with the downstream-side pinion P2, and the transferring rack TR of the carrier 1 is meshed with the speed change pinion P3, as in FIG. 17. Then, the speed change pinion P3 is maintained at the same speed as that of the downstream-side pinion P2 until the transferring rack TR is disengaged from the speed change pinion P3. The speed of the speed change pinion P3 is kept the same speed as that of the downstream-side pinion P2 immediately after the speed change pinion P3 and the transferring rack TR are released from a meshed state.

When the carriers 1 further move in the conveyance direction F from the state shown in FIG. 17 and the transferring racks TR are disengaged from the speed change pinions P3, the main racks MR of the carriers 1 mesh only with the downstream-side pinions P2. Thus, the carriers 1 driven by the downstream-side pinions P2 move in the conveyance direction F on the downstream-side stage B at the predetermined conveying speed TS2 and the predetermined conveying pitch TP2.

Effects

According to the configuration of the above-described conveyance apparatus, as the carriers 1 move, the transferring speed-change device C provided between the upstream-side stage A and the downstream-side stage B on which the conveying speeds TS1 and TS2 for the carriers 1 are different from each other and the conveying pitches TP1 and TP2 therebetween are different from each other, causes the speed change pinion P3 to mesh with the transferring rack TR at the same speed as that of the upstream-side pinion P1 meshed with the main rack MR; maintains the speed change pinion P3 at the same speed as that of the upstream-side pinion P1 until the main rack MR is disengaged from the upstream-side pinion P1; drives the carrier 1 by means of the speed change pinion P3 meshed with the transferring rack TR after the main rack MR is disengaged from the upstream-side pinion P1; causes the speed change pinion P3 to have the same speed as that of the downstream-side pinion P2 before the main rack MR meshes with the downstream-side pinion P2; and maintains the speed change pinion P3 at the same speed as that of the downstream-side pinion P2 until the speed change pinion P3 is disengaged from the transferring rack TR.

Therefore, each of the carriers 1 can be smoothly transferred from the upstream-side pinion P1 to the downstream-side pinion P2, which are different in speed, between the upstream-side stage A and the downstream-side stage B on which the conveying speeds TS1 and TS2 for the carriers 1 are different from each other and the conveying pitches TP1 and TP2 therebetween are different from each other.

In addition, the conveyance apparatus is configured with the rack-and-pinion mechanism composed of the main rack MR of the carrier 1 and the pinions P1 and the pinions P2 arranged at predetermined positions on the conveyance path, and is configured to enable constant and accurate meshing between the main rack MR and each of the pinions P1 and P2 allowing the carriers 1 to be conveyed from the upstream-side stage A to the downstream-side stage B. With this configuration, the conveying pitches TP1 and TP2 can be stably and reliably set to be within a predetermined accuracy.

Therefore, the relative position between an industrial robot operated through teaching playback and the object to be conveyed, such as a workpiece, is not deviated even on a stage where the industrial robot performs a work, whereby a required work can be reliably performed by the industrial robot.

Further, the position relative to the object to be conveyed, such as a workpiece, is not deviated even when a teaching work for the industrial robot is repeatedly performed (e.g., when a work is performed in which the object to be conveyed is conveyed for a distance corresponding to one cycle, and then returns to the original position thereof), i.e., when a reverse rotation operation is performed.

Furthermore, the pair of the noncircular gears 11A and 11B are used for speed change of the speed change pinion P3 which rotates at an irregular speed. Accordingly, reduction in size is enabled while the mechanism is simplified and the reliability thereof is enhanced.

Moreover, the input-side noncircular gear 11A of the noncircular gears is rotated at a constant speed by output from the transferring orthogonal-axis speed reducer R3 having the input shafts 6A and 6B to which the line shafts LS2 on the downstream-side stage B or the line shafts LS1 on the upstream-side stage A are connected. Accordingly, the transferring speed-change device C can be driven by the power of the drive unit D for driving the line shafts (e.g., LS2), whereby no drive device for separately driving the transferring speed-change device C is needed.

Furthermore, the numbers of teeth are equal between the input-side noncircular gear 11A and the output-side noncircular gear 11B, and the numbers of rotation of each of the input-side noncircular gear 11A and the output-side noncircular gear 11B during a time period needed for the carrier 1 to move for the conveying pitch TP1 or TP2 are set to an integer number. Accordingly, the carriers 1 continually entering the transferring speed-change device C at the conveying pitch TP1 can be reliably conveyed to the downstream-side stage B by means of the speed change pinion P3 being rotated integrally with the output-side noncircular gear 11B, while the transferring orthogonal-axis speed reducer R3 is driven by the power of the drive unit D for driving the line shafts.

Next, unlike the configuration of embodiment 1 in which the carrier 1 includes the transferring rack TR, a configuration will be described in which the carrier 1 does not include the transferring rack TR and includes only the main rack MR, but an operation similar to that in embodiment 1 is still performed.

Embodiment 2

In schematic front views for explaining an operation of a conveyance apparatus according to embodiment 2 shown in FIG. 18 to FIG. 21, the same or corresponding components, portions, or the like are denoted by the same reference characters as those in FIG. 1 to FIG. 17 of embodiment 1. Therefore, differences from embodiment 1 will be mainly described below.

In FIG. 18 to FIG. 21, the guide rails GR1 and GR2 are omitted.

Carrier

The carrier 1 shown in FIG. 18 to FIG. 21 includes the same main rack MR as that in embodiment 1, but does not include the transferring rack TR in embodiment 1, and includes a guide plate 18 which has a front end portion having a frontward-rising tilted surface 18A and a rear end portion having a rearward-rising tilted surface 18B.

Details of Transferring Orthogonal-Axis Speed Reducer and Area Therearound

The transferring speed-change device C has a configuration similar to that in embodiment 1, but the speed change pinion P3 meshes with the main rack MR of the carrier 1.

The transferring speed-change device C is supported by a linear movement guide 15 so as to be slidable in the up/down direction, elastically supported by a compression coil spring 16, and includes a guide roller 19 operated through the guide plate 18 of the carrier 1.

Figure 20:
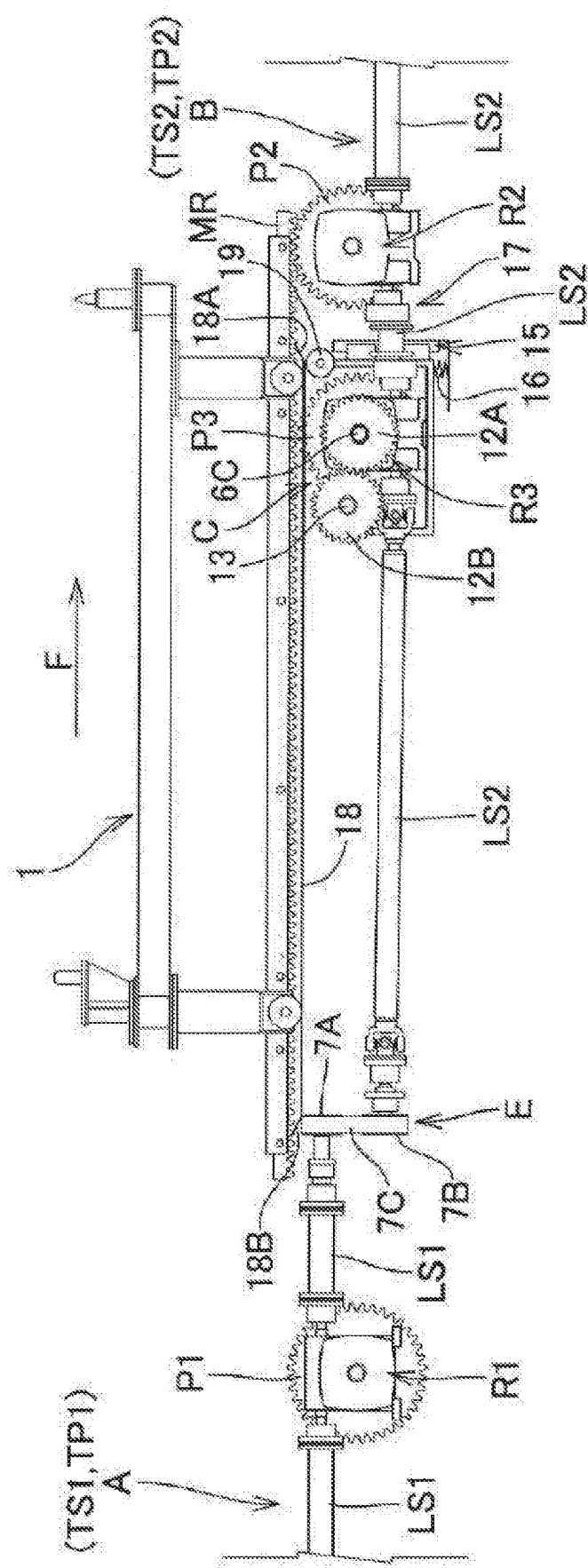
FIG. 20 is a schematic front view similar with FIGS. 18-19, for explaining the operation, and shows a state where the speed change pinion is disengaged from the main rack of the carrier by the transferring speed-change device descending as a result of a guide roller being pressed downward by a guide plate of the carrier.

The transferring speed-change device C is pressed downward as a result of the guide roller 19 being operated through the guide plate 18 as in FIG. 20, causing a shift. Such a shift is allowed by, for example, a Schmidt coupling 17 which is an eccentricity-allowing constant speed coupling. The rotations being performed at the same speed by the line shafts LS2 and LS2 on the front and rear sides of the Schmidt coupling 17 are maintained by the Schmidt coupling 17.

Operation of Conveyance Apparatus

The schematic front views for explaining the operation in FIG. 18 to FIG. 21 are referred to.

Figure 18:
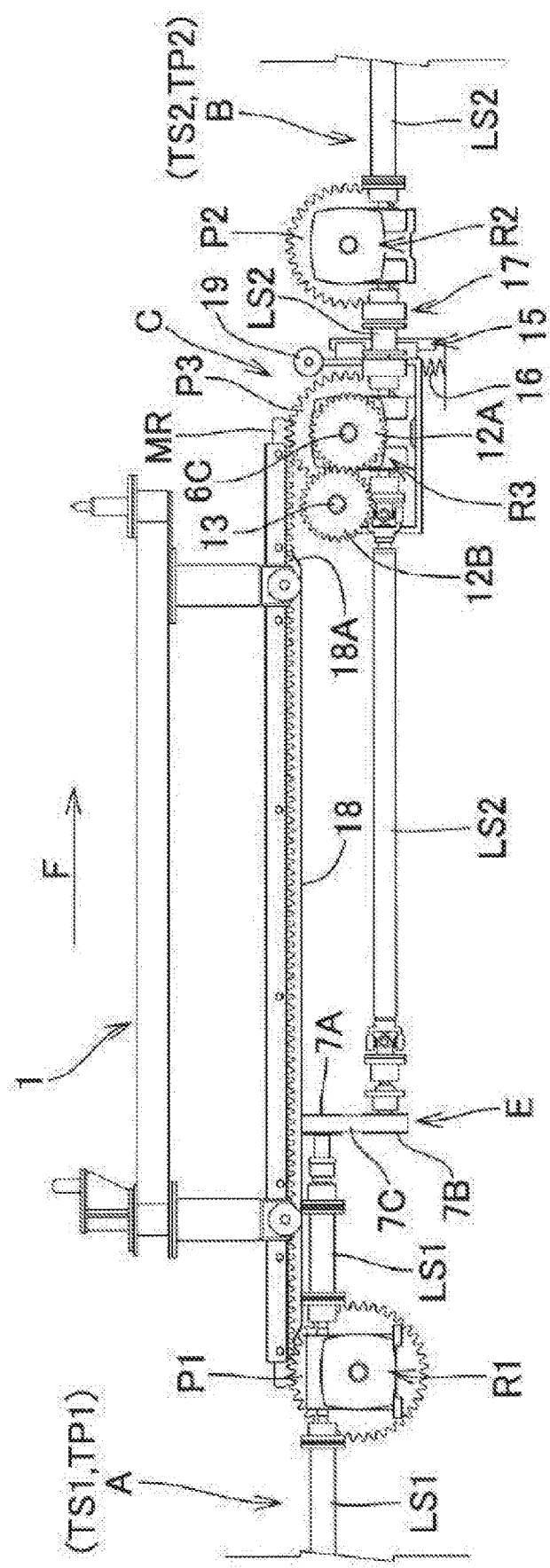
FIG. 18 is a schematic front view for explaining an operation of a conveyance apparatus according to embodiment 2 of the present invention, and shows a state where the main rack of the carrier is meshed with the upstream-side pinion and the speed change pinion.

At the time when the carrier 1 moves in the conveyance direction F, and thus the speed change pinion P3 of the transferring speed-change device C disposed between the upstream-side stage A and the downstream-side stage B meshes with the main rack MR, the speed change pinion P3 has already kept at the same speed as that of the upstream-side pinion P1 since before the speed change pinion P3 meshes with the main rack MR, and the upstream-side pinion P1 and the speed change pinion P3 which have the same speed are meshed with the main rack MR, as in FIG. 18.

Then, the speed change pinion P3 is maintained at the same speed as that of the upstream-side pinion P1 until the main rack MR is disengaged from the upstream-side pinion P1. After the carrier 1 further moves in the conveyance direction F and the main rack MR is disengaged from the upstream-side pinion P1, the carrier 1 is driven by the speed change pinion P3 meshed with the main rack MR.

Before the carrier 1 further moves in the conveyance direction F and the main rack MR meshes with the downstream-side pinion P2, the speed change pinion P3 comes to have the same speed as that of the downstream-side pinion P2.

Figure 19:
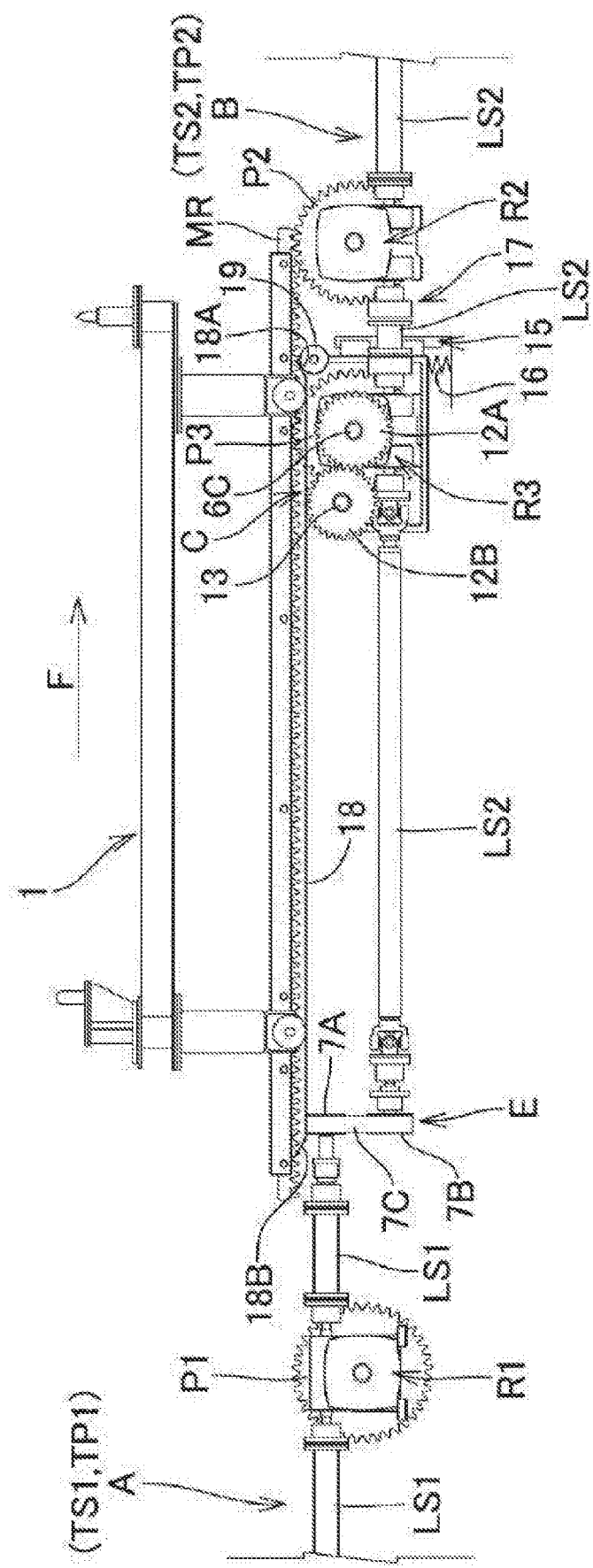
FIG. 19 is a schematic front view similar with FIG. 18, for explaining the operation, and shows a state where the main rack of the carrier is meshed with the downstream-side pinion and the speed change pinion.

In a state shown in FIG. 19 where the carrier 1 has further moved in the conveyance direction F and the main rack MR is meshed with the downstream-side pinion P2, the frontward-rising tilted surface 18A at the front end of the guide plate 18 of the carrier 1 is in contact with the guide roller 19 of the transferring speed-change device C.

When the carrier 1 further moves in the conveyance direction F, the guide roller 19 is pressed downward by the guide plate 18 of the carrier 1 as in FIG. 20, and thus the transferring speed-change device C descends so as to compress the compression coil spring 16. This allows the speed change pinion P3 to be disengaged from the main rack MR of the carrier 1. The speed of the speed change pinion P3 is kept at the same speed as that of the downstream-side pinion P2 immediately after the speed change pinion P3 and the main rack MR are released from a meshed state.

In a state where the speed change pinions P3 are disengaged from the main racks MR, the main racks MR of the carriers 1 are meshed only with the downstream-side pinions P2. Thus, the carriers 1 driven by the downstream-side pinions P2 move in the conveyance direction F on the downstream-side stage B at the predetermined conveying speed TS2 and the predetermined conveying pitch TP2.

When the carrier 1 further moves in the conveyance direction F, the guide roller 19 rolls along the lower surface of the guide plate 18, and the speed change pinion P3 is kept disengaged from the main rack MR of the carrier 1.

Figure 21:
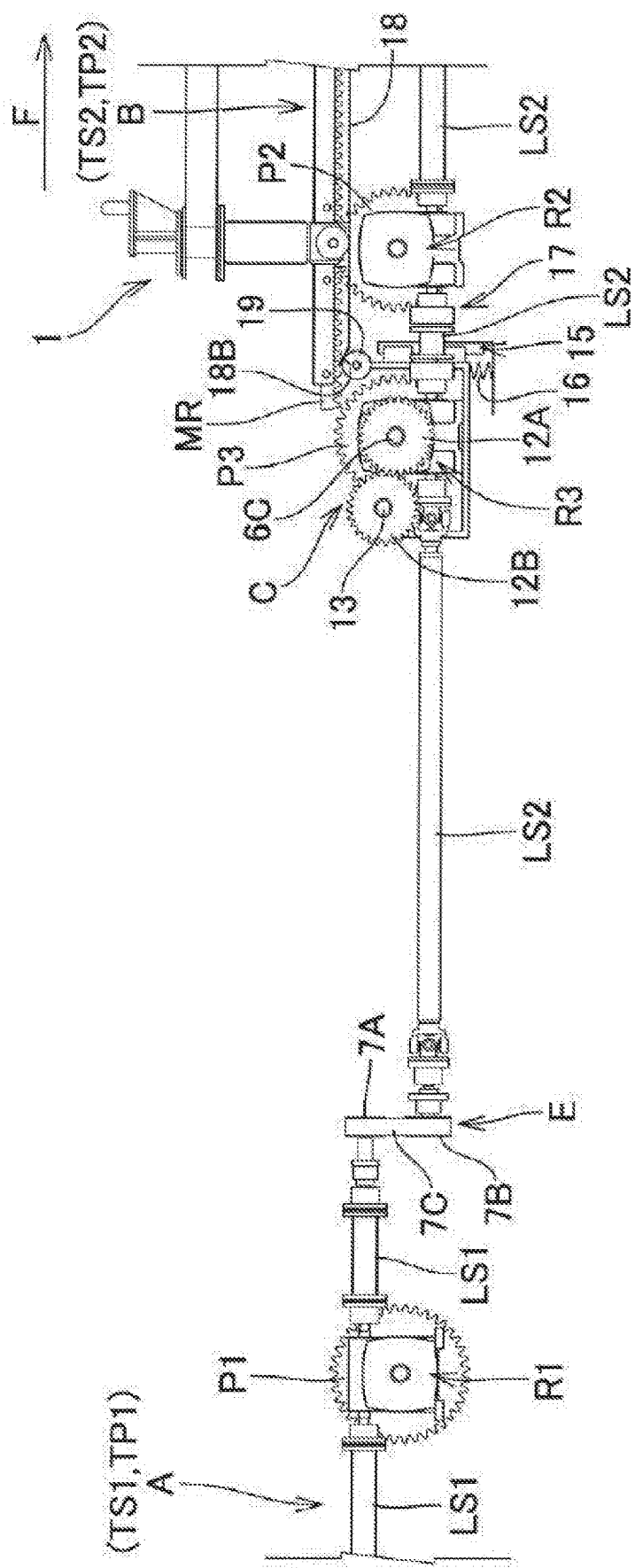
FIG. 21 is a schematic front view similar with FIGS. 18-20, for explaining the operation, and shows a state where the transferring speed-change device is restored to have the original height thereof owing to the resilience of a compression coil spring at a position where the speed change pinion does not mesh with the main rack even when the speed change pinion is returned to the original position thereof.

When the carrier 1 further moves in the conveyance direction F so that the speed change pinion P3 does not mesh with the main rack MR even when the speed change pinion P3 is returned to the original position thereof as in FIG. 21, the guide roller 19 becomes apart from the guide plate 18 after rolling along the rearward-rising tilted surface 18B at the rear end of the guide plate 18. Accordingly, the transferring speed-change device C is restored to have the original height (e.g., see FIG. 18) owing to the resilience of the compression coil spring 16.

As described above, in embodiment 2, a mechanism is provided in which, after the main rack MR of the carrier 1 is transferred to the downstream-side pinion P2, the transferring speed-change device C is shifted to allow the speed change pinion P3 to be disengaged from the main rack MR, and the transferring speed-change device C is returned to the original position thereof in a state where the carrier 1 has moved in the conveyance direction to release the speed change pinion P3 from meshing with the main rack MR even when the speed change pinion P3 is returned to the original position thereof.

Embodiment 3

Besides the configuration in embodiment 2, a speed increaser may be added between the output-side noncircular gear 11B and the speed change pinion P3, as the configuration in which the carrier 1 does not include the transferring rack TR and includes only the main rack MR, but an operation similar to that in embodiment 1 is still performed.

The speed increaser is for performing drive over the entire length of the main rack MR by means of the speed change pinion P3 meshed with the main rack MR, before each of the noncircular gears 11A and 11B completes a single rotation.

That is, the speed increaser should be controlled so that each of the noncircular gears 11A and 11B rotates an integral number of times within the conveying pitch TP2 on the downstream-side stage B, and a single rotation of each of the noncircular gears 11A and 11B allows the main rack MR to be driven for a distance corresponding to its length in the conveyance direction F and an additional length.

With a single rotation, the speed of the output-side noncircular gear 11B is changed as in the following (a) to (e). The only period during which the main rack MR and the speed change pinion P3 are allowed to mesh with each other, is a time period between (a) to (c). Therefore, the above-described additional length corresponds to a period between the following (d) and (e).

(a) Speed of upstream-side pinion P1
(b) Speed reduction or speed increase
(c) Speed of downstream-side pinion P2
(d) Speed increase or speed reduction
(e) Speed of upstream-side pinion P1

Effects

The configurations as in embodiments 2 and 3 described above also exhibit the same effects as those in embodiment 1.

In the explanations made above, the example has been described where a pair of noncircular gears are used as the mechanical-type speed change mechanism for mechanically changing speed of the speed change pinion. Here, the mechanical-type speed change mechanism for mechanically changing speed of the speed change pinion is not limited to such a pair of noncircular gears. Instead of the pair of noncircular gears, for example, a mechanical-type speed change mechanism which transmits, to the speed change pinion, irregular speed reciprocating motion performed by a cam mechanism in which a follower moves along an outer circumferential groove of a cylindrical cam rotating at a constant speed, may be used as the mechanical-type speed change mechanism for mechanically performing speed change of the speed change pinion. In such a mechanism, no slide occurs.

The foregoing description of the embodiments is in all aspects illustrative and not restrictive. Numerous modifications and variations can be devised without departing from the scope of the present invention.

What is claimed is:

1. A conveyance apparatus comprising:
   carriers movable in a conveyance direction along a track and configured to support objects to be conveyed;
   racks having rack teeth, the racks being provided to the carriers and extending in the conveyance direction;
   a plurality of pinions configured to mesh with each rack and arranged along the track;
   a mechanical connection section connecting the plurality of pinions and extending in the conveyance direction; and
   a drive unit configured to drive the mechanical connection section,
   the conveyance apparatus being for use in a production line including stages which are different from one another in a conveying speed for the carriers and a conveying pitch therebetween, wherein
   the mechanical connection section is subjected to speed change via a speed change machine, between an upstream-side stage and a downstream-side stage which are different from each other in the conveying speed for the carriers and the conveying pitch therebetween,
   a transferring speed-change device is provided between the upstream-side stage and the downstream-side stage,
   the transferring speed-change device is connected to the mechanical connection section on the upstream-side stage or the mechanical connection section on the downstream-side stage,
   the transferring speed-change device includes
      a speed change pinion configured to be subjected to speed change during movement of each of the carriers, and
      a mechanical-type speed change mechanism configured to mechanically perform the speed change in the speed change pinion,
   on the upstream-side stage,
      the carrier is moved in a state where the rack is meshed with an upstream-side pinion among the pinions,
   on the downstream-side stage,
      the carrier is moved in a state where the rack is meshed with a downstream-side pinion among the pinions, and,
   between the upstream-side stage and the downstream-side stage,
      each one of a pair of noncircular gears in the mechanical-type speed change mechanism of the transferring speed-change device is rotated at a predetermined integer number of rotations in a time period needed for the carrier to move for a predetermined conveying pitch causing a state where the speed change pinion subjected to the speed change by the mechanical-type speed change mechanism, to be meshed with the rack provided to the carrier or a rack different from the rack provided to the carrier, with a speed of the speed change pinion being changed from a speed of the upstream-side pinion to a speed of the downstream-side pinion within a period from start of meshing of the speed change pinion with the rack or the different rack to end of the meshing.

2. The conveyance apparatus according to, claim 1 wherein
   a circular pitch of the upstream-side pinion that meshes with the rack and a circular pitch of the downstream-side pinion that meshes with the rack are equal to each other, and the conveying pitch is set to a pitch obtained by multiplying the circular pitch by an integer.

3. A conveyance apparatus comprising:
   carriers movable in a conveyance direction along a track and configured to support objects to be conveyed;
   racks having rack teeth, the racks being provided to the carriers and extending in the conveyance direction;
   a plurality of pinions configured to mesh with each rack and arranged along the track;
   a mechanical connection section connecting the plurality of pinions and extending in the conveyance direction; and
   a drive unit configured to drive the mechanical connection section,
   the conveyance apparatus being for use in a production line including stages which are different from one another in a conveying speed for the carriers and a conveying pitch therebetween, wherein
   the mechanical connection section is subjected to speed change via a speed change machine, between an upstream-side stage and a downstream-side stage which are different from each other in the conveying speed for the carriers and the conveying pitch therebetween,
   a transferring speed-change device is provided between the upstream-side stage and the downstream-side stage,
   the transferring speed-change device is connected to the mechanical connection section on the upstream-side stage or the mechanical connection section on the downstream-side stage,
   the transferring speed-change device includes
      a speed change pinion configured to be subjected to speed change during movement of each of the carriers, and
      a pair of noncircular gears which are an input-side noncircular gear and an output-side noncircular gear configured to mechanically perform the speed change in the speed change pinion,
   on the upstream-side stage,
      the carrier is moved in a state where the rack is meshed with an upstream-side pinion among the pinions,
   on the downstream-side stage,
      the carrier is moved in a state where the rack is meshed with a downstream-side pinion among the pinions, and,
   between the upstream-side stage and the downstream-side stage,
      the carrier is moved in a state where the speed change pinion subjected to the speed change by the pair of noncircular gears of the transferring speed-change device, is meshed with a part of the rack provided to the carrier or a rack that is different from the rack provided to the carrier and has a total length shorter than a length of the rack provided to the carrier, with a speed of the speed change pinion being changed from a speed of the upstream-side pinion to a speed of the downstream-side pinion within a period from start of meshing of the speed change pinion with the part of the rack or the different rack to end of the meshing.

4. The conveyance apparatus according to claim 3 further comprising
a connection portion configured to perform speed increase or speed reduction, between the input-side noncircular gear, and the mechanical connection section on the upstream-side stage or the mechanical connection section on the downstream-side stage.

5. The conveyance apparatus according to claim 4, wherein
an average rotation speed of the speed change pinion and the output-side noncircular gear of the pair of noncircular gears is an intermediate speed between a rotation speed of the upstream-side pinion and a rotation speed of the downstream-side pinion, or a speed approximate to the intermediate speed.

6. The conveyance apparatus according to claim 3, wherein
a circular pitch of the upstream-side pinion that meshes with the rack and a circular pitch of the downstream-side pinion that meshes with the rack are equal to each other, and the conveying pitch is set to a pitch obtained by multiplying the circular pitch by an integer.

7. The conveyance apparatus according to claim 3, wherein
a total length of the rack is longer than a distance from a downstream-side end of the downstream-side pinion to an upstream-side end of the speed-change pinion.

8. The conveyance apparatus according to claim 3, wherein the carrier includes a transferring rack having rack teeth and a predetermined length, the transferring rack extending parallelly to the rack and being positioned so as to be apart therefrom in a horizontal direction orthogonal to the conveyance direction, and as the carrier moves, the transferring speed-change device causes the speed change pinion to mesh with the transferring rack at a same speed as that of the upstream-side pinion meshed with the rack, maintains the speed change pinion at the same speed as that of the upstream-side pinion until the rack is disengaged from the upstream-side pinion, drives the carrier by means of the speed change pinion meshed with the transferring rack, after the rack is disengaged from the upstream-side pinion, causes the speed change pinion to have a same speed as that of the downstream-side pinion before the rack meshes with the downstream-side pinion, and maintains the speed change pinion at the same speed as that of the downstream-side pinion until the transferring rack is disengaged from the speed change pinion.

9. The conveyance apparatus according to claim 3, wherein as the carrier moves, the transferring speed-change device causes the speed change pinion to mesh with the rack at a same speed as that of the upstream-side pinion meshed with the rack, maintains the speed change pinion at the same speed as that of the upstream-side pinion until the rack is disengaged from the upstream-side pinion, drives the carrier by means of the speed change pinion meshed with the rack, after the rack is disengaged from the upstream-side pinion, and causes the speed change pinion to have a same speed as that of the downstream-side pinion before the rack meshes with the downstream-side pinion, and after the rack is transferred to the downstream-side pinion, a mechanism shifts the transferring speed-change device so that the speed change pinion is disengaged from the rack, and returns the transferring speed-change device to an original position thereof in a state where the carrier has moved in the conveyance direction so that the speed change pinion does not mesh with the rack even when the speed change pinion is returned to an original position thereof.

* * * * *